US010663305B2

(12) United States Patent
Balu

(10) Patent No.: US 10,663,305 B2
(45) Date of Patent: May 26, 2020

(54) MAP MATCHED AGGREGATION FOR K-ANONYMITY IN TRAJECTORY DATA

(71) Applicant: HERE Global B.V., Eindhoven (NL)

(72) Inventor: Raghavendran Balu, Eindhoven (NL)

(73) Assignee: HERE Global B.V., Eindhoven (NL)

( * ) Notice: Subject to any disclaimer, the term of this patent is extended or adjusted under 35 U.S.C. 154(b) by 129 days.

(21) Appl. No.: 16/036,128

(22) Filed: Jul. 16, 2018

(65) Prior Publication Data

US 2020/0018607 A1   Jan. 16, 2020

(51) Int. Cl.
*G01C 21/32* (2006.01)
*H04L 29/06* (2006.01)
*G08G 1/065* (2006.01)
*G06F 16/29* (2019.01)

(52) U.S. Cl.
CPC ............ *G01C 21/32* (2013.01); *G06F 16/29* (2019.01); *G08G 1/065* (2013.01); *H04L 63/0421* (2013.01)

(58) Field of Classification Search
CPC ........ G01C 21/32; G06F 16/29; G08G 1/065; H04L 63/0421
USPC ........................................................ 701/446
See application file for complete search history.

(56) References Cited

U.S. PATENT DOCUMENTS

| | | | |
|---|---|---|---|
| 8,463,289 B2 | 6/2013 | Shklarski et al. | |
| 8,812,524 B2 | 8/2014 | Chen et al. | |
| 9,547,845 B2 * | 1/2017 | Agrawal | G06Q 10/107 |
| 9,842,442 B2 | 12/2017 | Konicek | |
| 10,382,889 B1 | 8/2019 | Ajmeri | |
| 2014/0108361 A1 | 4/2014 | Biswas et al. | |
| 2015/0350891 A1 * | 12/2015 | Arunkumar | H04W 8/16 455/456.2 |
| 2017/0169252 A1 | 6/2017 | Ukena-Bonfig et al. | |
| 2017/0325056 A1 * | 11/2017 | Mehta | H04W 4/024 |
| 2018/0014161 A1 | 1/2018 | Warren | |

OTHER PUBLICATIONS

Abul, Osman, Francesco Bonchi, and Mirco Nanni. "Never walk alone: Uncertainty for anonymity in moving objects databases." Data Engineering, 2008. ICDE 2008. IEEE 24th International Conference on. Ieee, 2008.

(Continued)

*Primary Examiner* — Muhammad Shafi
(74) *Attorney, Agent, or Firm* — Lempia Summerfield Katz LLC

(57) ABSTRACT

An apparatus for providing anonymity in geographic data for probe devices in a geographic region for a location-based service includes at least a database, a map matcher, and an aggregation calculator. The database is configured to store trajectory data based on sequences of sensor measurements of the probe devices. The map matcher is configured to match a map, including cells, with the trajectory data, and each of the cells includes edges and a face. The aggregation calculator configured to calculate a number of trajectories in the trajectory data that passes through each of the edges and compare the number of trajectories in the trajectory data for at least one of the edges to a threshold. The geographic data is modified in response to the comparison of the number of trajectories in the trajectory data for the at least one of the edges.

18 Claims, 14 Drawing Sheets

(56) References Cited

OTHER PUBLICATIONS

Andreas Fabri. 2D Polyline Simplification. In CGAL User and Reference Manual. CGAL Editorial Board, 4.12 edition, 2018.
Andrienko, Natalia V., and Gennady L. Andrienko. "Spatial generalization and aggregation of massive movement data." IEEE Trans. Vis. Comput. Graph. 17.2 (2011): 205-219.
Bonchi, Francesco, Laks VS Lakshmanan, and Hui Wendy Wang. "Trajectory anonymity in publishing personal mobility data." ACM Sigkdd Explorations Newsletter 13.1 (2011): 30-42.
Byun, Ji-Won, et al. "Efficient k-anonymization using clustering techniques." International Conference on Database Systems for Advanced Applications. Springer, Berlin, Heidelberg, 2007.
Chen, Rui, et al. "Privacy-preserving trajectory data publishing by local suppression." Information Sciences 231 (2013): 83-97.
Chow, Chi-Yin, and Mohamed F. Mokbel. "Trajectory privacy in location-based services and data publication." ACM Sigkdd Explorations Newsletter 13.1 (2011): 19-29.
Dempster, Arthur P., Nan M. Laird, and Donald B. Rubin. "Maximum likelihood from incomplete data via the EM algorithm." Journal of the royal statistical society. Series B (methodological) (1977): 1-38.
El-Rashidy, M., et al. "An Effective K-Anonymity Clustering Method for Less Effectiveness on Accuracy of Data Mining Results." International Journal of Advanced Research in Computer Science 2.5 (2011).
Fengyun, Li, et al. "Segment Clustering Based Privacy Preserving Algorithm for Trajectory Data Publishing." China Conference on Wireless Sensor Networks. Springer, Singapore, 2017.
Galler, Bernard A., and Michael J. Fisher. "An improved equivalence algorithm." Communications of the ACM 7.5 (1964): 301-303.
Hunter, Timothy, Pieter Abbeel, and Alexandre Bayen. "The path inference filter: model-based low-latency map matching of probe vehicle data." IEEE Transactions on Intelligent Transportation Systems 15.2 (2014): 507-529.
Kohonen, T. "Exploration of very large databases by self-organizing maps." vol. I, pp. PL1-PL6, Proceedings of ICNN 1997.
Lafferty, John, Andrew McCallum, and Fernando CN Pereira. "Conditional random fields: Probabilistic models for segmenting and labeling sequence data." (2001).
Lin, Dan, et al. "Privacy-preserving location publishing under road-network constraints." International Conference on Database Systems for Advanced Applications. Springer, Berlin, Heidelberg, 2010.
Liu, Jie, et al. "A Density-based Clustering Method for K-anonymity Privacy Protection." Journal of Information Hiding and Multimedia Signal Processing 8.1 (2017): 12-18.
Monreale, Anna, et al. "Movement data anonymity through generalization." Trans. Data Privacy 3.2 (2010): 91-121.
Nergiz, Mehmet Ercan, Maurizio Atzori, and Yucel Saygin. "Towards trajectory anonymization: a generalization-based approach." Proceedings of the SIGSPATIAL ACM GIS 2008 International Workshop on Security and Privacy in GIS and LBS. ACM, 2008.
Nergiz, Mehmet Ercan, Maurizio Atzori, and Yucel Saygin. Perturbation-driven anonymization of trajectories. Technical Report 2007-TR-017, ISTI-CNR, Pisa, 2007.
Poulis, Giorgos, et al. "Select-organize-anonymize: A framework for trajectory data anonymization." Data Mining Workshops (ICDMW), 2013 IEEE 13th International Conference on. IEEE, 2013.
Sui, Peipei, and Xianxian Li. "ROAT: Road-Network-Based Anonymization of Trajectories." Ubiquitous Intelligence & Computing, Advanced and Trusted Computing, Scalable Computing and Communications, Cloud and Big Data Computing, Internet of People, and Smart World Congress (UIC/ATC/ScalCom/CBDCom/IoP/SmartWorld), 2016 Intl IEEE Conferences. IEEE, 2016.
Wernke, Marius, et al. "A classification of location privacy attacks and approaches." Personal and ubiquitous computing 18.1 (2014): 163-175.
Kohonen, Teuvo. "The self-organizing map." Neurocomputing 21.1-3 (1998): 1-6.

* cited by examiner

MAP MATCHED AGGREGATION FOR K-ANONYMITY IN TRAJECTORY DATA

FIELD

The following disclosure relates to anonymity for probe data for location-based services.

BACKGROUND

The Global Positioning System (GPS) or another global navigation satellite system (GNSS) provides location information to a receiving device anywhere on Earth as long as the device has a substantial line of sight without significant obstruction to three or four satellites of the system. Location-based services control features of an application based on location information from a GNSS or another source.

The increasing trend of smart phones and wide spread integration of GPS devices in vehicles lead to availability of large pool of user location data including stay-points, check-ins and mobility traces. When such mobility data is aggregated in a centralized manner, it makes new applications such as traffic analysis and prediction possible. The aggregated and sharing of mobility traces data is called trajectory data publishing.

Trajectory data publishing is central to location data analysis and has wide applications including urban planning, location-based services, intelligent vehicles, logistics, and others. Though the usefulness of such publishing is unquestionable, the trade-off being made is privacy of contributing users and control over data.

The privacy factor is equally important, considering that user location data is personal and sensitive. When it is possible to trace back the contributing user it might lead to unintended consequences that harms the safety and security of contributors. Equally important is the role of regulatory and compliance becomes crucial. Hence data publishing should not violate user rights and preserve their privacy. In practice the aggregation is oblivious to the contributing user and hence the responsibility or preserving user privacy is pushed to the service provider or aggregator.

SUMMARY

In one embodiment, a method for providing anonymity in geographic data for probe devices in a geographic region for a location-based service includes receiving trajectory data based on sequences of sensor measurements of the probe devices, generating, by a processor, data representing a map of initial geographic data using a plurality of cells, wherein each of the plurality of cells includes a plurality of edges and a face, map matching the trajectory data to the plurality of cells, calculating, by the processor, a number of trajectories in the trajectory data that passes through each of the plurality of edges, performing, by the processor, a comparison of the number of trajectories in the trajectory data for at least one of the plurality of edges to a threshold, and modifying, by the processor, the geographic data in response to the comparison of the number of trajectories in the trajectory data for the at least one of the plurality of edges.

In one embodiment, an apparatus for providing anonymity in geographic data for probe devices in a geographic region for a location-based service includes a database, a map matcher, and an aggregation calculator. The database is configured to store trajectory data based on sequences of sensor measurements of the probe devices. The map matcher is configured to match a map, including a plurality of cells, with the trajectory data, and each of the plurality of cells includes a plurality of edges and a face. The aggregation calculator is configured to calculate a number of trajectories in the trajectory data that passes through each of the plurality of edges and compare the number of trajectories in the trajectory data for at least one of the plurality of edges to a threshold, and the geographic data is modified in response to the comparison of the number of trajectories in the trajectory data for the at least one of the plurality of edges.

In one embodiment, a non-transitory computer readable medium including instructions that when executed by a process are configured to perform map matching trajectory data to a plurality of road segments in a subset of map data, calculating a number of trajectories in the trajectory data that passes through each of the plurality of road segments, performing a comparison of the number of trajectories in the trajectory data for at least one of the plurality of road segments to a threshold, and modifying the subset of map data in response to the comparison of the number of trajectories in the trajectory data for the at least one of the plurality of road segments to the threshold.

BRIEF DESCRIPTION OF THE DRAWINGS

Exemplary embodiments of the present invention are described herein with reference to the following drawings.

DETAILED DESCRIPTION

Figure 1:
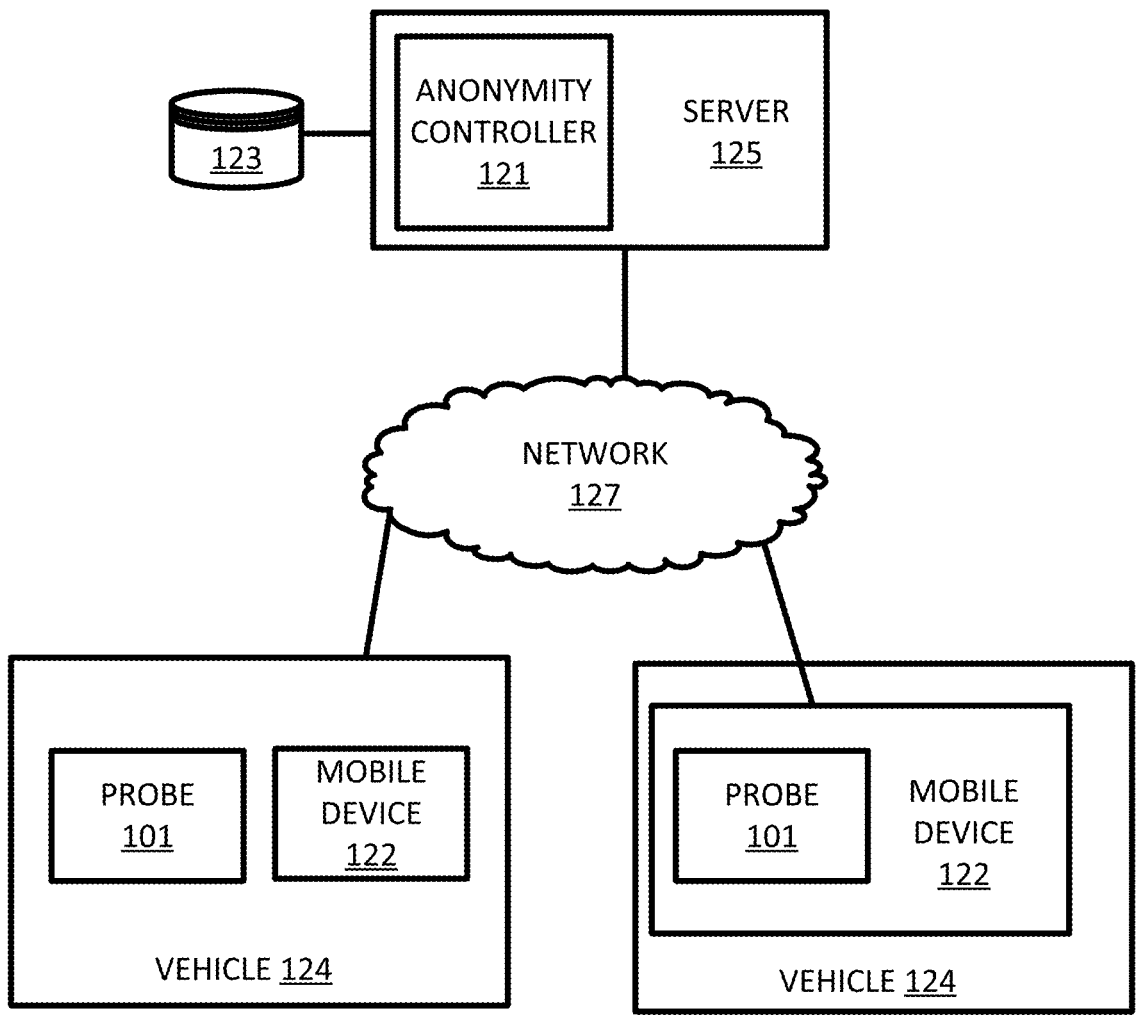
FIG. 1 illustrates an example system for map matching to achieve anonymity in location trajectory data.

Location information is detected and stored by a variety of devices. Primarily, mobile devices such as vehicles, mobile phones or smart phones are continuously (or at frequent intervals) determining their current positions and reporting the location information. The location information may be logged by many different entities. Social media applications may track users for the purpose of identifying contacts or places to visit and may provide content in response to location. Mapping and navigation application provide turn-by-turn directions or maps based on the location information. Crowd sourcing applications provide reviews on products or points of interest (POIs) according to location information. Vehicular trajectory data publishing has many useful applications in traffic analysis and prediction, urban planning and Intelligent vehicles, fleet management, and other applications.

In some examples, an intermediary such as a map developer maintains the database of location information. The map develop may provide an open location platform that the other application may access to obtain location information. The security or privacy of the location information depends on the security policies of each of the applications. A data breach by any of these applications may result in the identity and habits of the users being compromised.

To protect privacy the location information may be stored anonymously using anonymous probe identities. That is, the identity of the user may be anonymous with respect to the log of location information. Providing anonymous data to location-based services and data publishing protects the identity of the users. The term anonymization means that users access location based-services provided by centralized services without revealing their location trajectory to these providers. The anonymization component acts a proxy for such users and acts on their behalf during service access to make sure that the providers cannot construct trajectories out of the access logs. Another prominent use-case is a trusted third party which is in possession of trajectory data aggregated from a huge collection of users, trying to publish on their behalf, without revealing their identities.

An example naive approach is to remove identifying qualifiers and release the data, which is also called as pseudonymization. In practice, this does little to mitigate the risks because an adversary may break the protection and identify the user with external information. A repeatedly observed trip from a residential place to a business place may suggest the home location and office location; frequent visits to a hospital may suggest health issues. The following embodiments provide improved anonymization of pseudonymization.

In another aspect, strong privacy preserving techniques involving data perturbation, lead to noise data that is published impacting the utility of shared data. This requires use of more sophisticated privacy preserving techniques that can guarantee best utility-privacy trade-off.

K-anonymity is a property of a set of data such that the data for one person or entity cannot be distinguished from at least k−1 people or entities in the release. In some embodiments herein, K-anonymization is used to provide anonymity in trajectory data.

A road network may be modeled as a graph where intersections are treated as vertices and links connecting those intersections are treated as edges. The model aids in matching the points of the trajectories to corresponding road links. The trajectories passing through road links are aggregated together and anonymized based on aggregate information. The following embodiments include three successive steps that may be repeated multiple times: initialize, match, and return the anonymized data. The following embodiments may include monitoring privacy constraints and stopping the iterative process when the privacy constraints are met. One or more of the trajectories may be matched to the map data including a sequence of road links that is closest to the trajectory. A count for each road link is aggregated to determine the number of trajectories that has been matched to the road link. Road link with counts less than a predetermined threshold (K) are removed. The following embodiments include a geometric arrangement as map representation model, a probabilistic filter as map matcher, and a count based aggregator and anonymizer.

The following embodiments relate to several technological fields including but not limited to navigation, autonomous driving, assisted driving, traffic applications, and other location-based systems. The following embodiments achieve advantages in each of these technologies because the extent of the geographic area that accurate data can be provided to applications or third parties while maintaining the requisite security and private is improved. In each of the technologies of navigation, autonomous driving, assisted driving, traffic applications, and other location-based systems, the number of users that can be adequately served is increased. In addition, users of navigation, autonomous driving, assisted driving, traffic applications, and other location-based systems are more willing to adopt these systems given the technological advances in the data security.

FIG. 1 illustrates an example system for providing K-anonymity to trajectory data or probe data. The trajectory data may be a sequence of points collected by a probe or mobile device. Anonymity of the users means that the privacy is protected from unauthorized users revealing the identity and actions of the users and protected from analysis of user habits (e.g., frequently visited places) revealing the identity and actions of the users. The following embodiments prevent a tracking threat. An attacker that gains access to the data is prevented from determining identities from the data.

In FIG. 1, one or more vehicles 124 are connected to the server 125 though the network 127. The server 125 includes an anonymity controller 121 that modifies a set of trajectory data to provide anonymization. The vehicles 124 may be directly connected to the server 125 or through an associated mobile device 122. A map developer system, including the server 125 and a geographic database 123, exchanges (e.g., receives and sends) data from the vehicles 124. The mobile devices 122 may include local databases corresponding to a local map, which may be modified according to the server 125. The local map may include a subset of the geographic database 123 and are updated or changed as the vehicles 124 travel. The mobile devices 122 may be standalone devices such as smartphones or devices integrated with vehicles. Additional, different, or fewer components may be included.

Each vehicle 124 and/or mobile device 122 may include position circuitry such as one or more processors or circuits for generating probe data. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). In some examples, the probe data is collected in response to movement by the probe 101 (i.e., the probe reports location information when the probe 101 moves a threshold distance). The predetermined time interval for generating the probe data may be specified by an application or by the user. The interval for providing the probe data from the mobile device 122 to the server 125 may be may be the same or different than the interval for collecting the probe data. The interval may be specified by an application or by the user.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

The anonymity controller 121 provides the anonymized data to the mobile device 122. The mobile device 122 may use the anonymized trajectory data for local applications. For example, a map application may provide previously traveled routes or visited POIs according to the anonymized trajectory data. A social media application may provide targeted content based on the anonymized trajectory data. A game application may provide a setting or objects within the game in response to the anonymized trajectory data.

Figure 2:
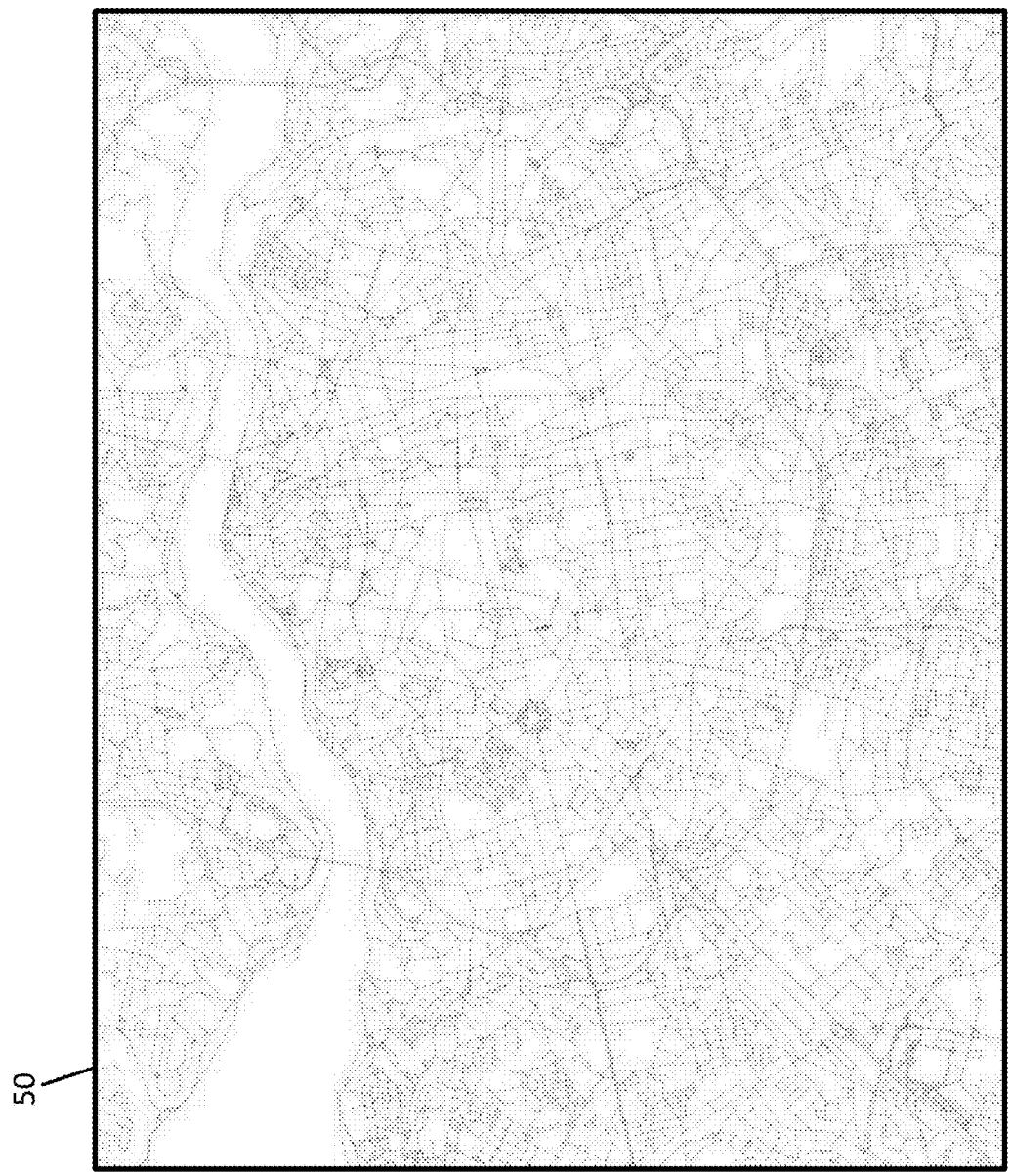
FIG. 2 illustrates an example set of trajectory data.

FIG. 2 illustrates a map 50 for map matching a set of trajectory data. The set of trajectory data was collected by a group of taxicabs in the city of Porto, Portugal. A trajectory is a sequence of the probe data. For example, a trajectory is a sequence of spatiotemporal coordinates $\mathcal{T} = \{t_u\}$, with $t_u = <(x_1,y_1,t_1) \ldots (x_n,y_n,t_n)>$, where $(x_1,y_1,t_1)$ is the $i^{th}$ sample instance of the trajectory with $(x_i,y_i)$ being the spatial information (longitude, latitude) and $t_i$ being the timestamp of the sample. A trajectory can also be decomposed into a sequence of segments $<(x_i,y_i,t_i), (x_{i+1},y_{i+1},t_{i+1})>$ formed by successive samples of the trajectory. This leads to the definition of sub-trajectory as a sub-sequence of the original trajectory $t_u[1:m] = <(x_1,y_1,t_1) \ldots (x_m,y_m,t_m)> \subset t_u | m \leq n$. The trajectory data may be stored in memory or database 123.

Releasing or publishing an unchanged version of the sequence of spatiotemporal coordinates $\mathcal{T}$ may violate usual privacy (e.g., reveal the identities of one or more persons, devices, or entities). Rather than release or publish the sequence of spatiotemporal coordinates $\mathcal{T}$, the following embodiments release or publish $\widetilde{\mathcal{T}}$ (anonymized trajectory data) such that $|\widetilde{\mathcal{T}} - \mathcal{T}| < B$, such that B signifies the maximal allowed distortion that is introduced by the privacy preserving mechanism. Different privacy metrics pose certain restrictions on to $\widetilde{\mathcal{T}}$ assure privacy.

K-anonymity is a privacy enforcing metric that assures privacy means of duplication and indistinguishability. A database or a set of data is said to be K-anonymous if for every instance in a database, there are K−1 similar (indistinguishable) instances in the database, that is, for every $|t_u \in \widetilde{\mathcal{T}}| \geq K$. The problem can be interpreted as binning trajectories in minimum k-sized bins such that distortion B is minimized.

Achieving such anonymity optimally is a challenging problem and is NP-hard (e.g., the time for solving the problem of anonymity is bounded by a polynomial expression in the size of the input and the solution is quickly solvable). The peculiarity of trajectory data when compared to regular relational database is that in case of relational data, there is a separation between quasi-identifier and sensitive attributes. In trajectory data the difference is blurry (i.e. sub-trajectory is a quasi-identifier by itself that can de-anonymize the rest of trajectory that is treated as sensitive attribute). Consider an adversary who has sub-trajectories in possession and uses it to identify the users for rest of the data. This property makes anonymizing mechanisms challenging for location data.

Techniques such as suppression, segmentation, generalization, clustering, and resampling that may be performed on the trajectory data. Suppression is simpler among these and achieves privacy by removing instances that violates K-anonymity which impacts utility. The removed instances may be one or more samples (e.g., a subset of) samples that form a trajectory. The removed instances may include one or more trajectories in the database altogether. Segmentation breaks long trajectories into smaller sub-trajectories such that the database constructed out of such sub-trajectories is K-anonymous. Generalization, on the other hand, achieves by generalizing the instances in such a way that instances are collapsed together to a coarser level. Spatial generalization involves abstracting individual instances to higher level spatial regions. Generalization may also be applied to the trajectory data in time to abstract individual instance to larger temporal groups. Clustering achieves indistinguishability by taking advantage of the underlying data distribution and grouping trajectory segments based on similarity among them. Resampling requires clustering to find equivalence classes out of trajectories and reconstructs original trajectory with samples found within the groups (e.g. representative points).

A combination of the above techniques may be applied for trajectory publishing. The majority of these techniques are greedy and incremental, leaving scope for devising better techniques that introduces much lesser distortion without violating K-anonymity. Also most of these techniques are neither make assumption about the data source (e.g. vehicular), nor designed to take advantage of external resources such as map data, which can significantly improve utility without impacting privacy. The following embodiments may include additional techniques for anonymizing the trajectory data that overcome both these shortcomings.

Figure 3:
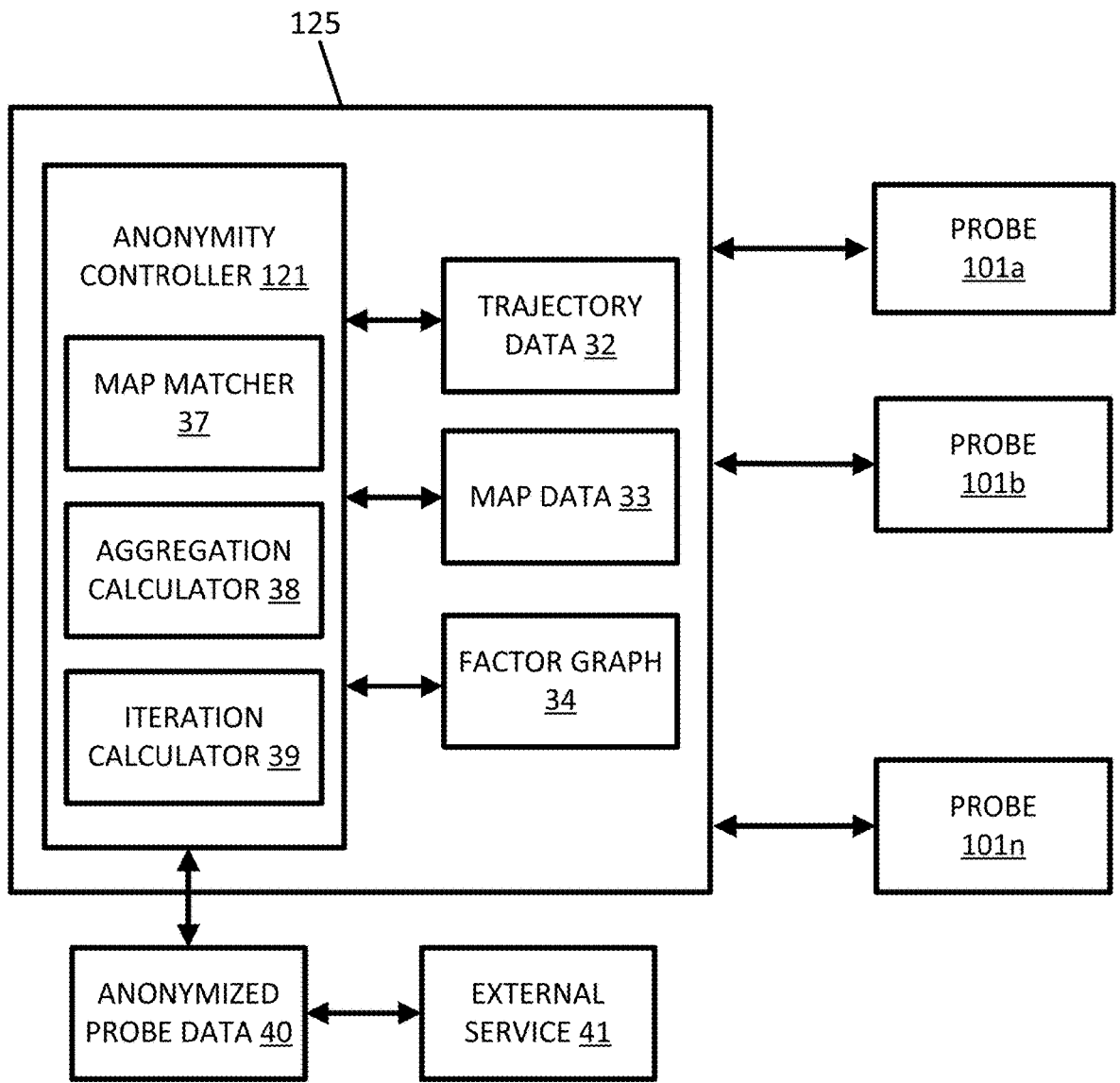
FIG. 3 illustrates an example central server for controlling anonymity in location trajectory data.

FIG. 3 illustrates an example central server 125 for modifying trajectory data for anonymization. The server 125 includes the anonymity controller 121 connected to multiple mobile devices 101a-101n. The anonymity controller 121 includes a map matcher 37, an aggregation calculator 38, and an iteration calculator 39. The anonymity controller 121 accesses data stored in memory or received from the mobile device 101. The data includes trajectory data 32, map data 33, and a factor graph table 34. The factor graph table 34 may describe parameters for a probabilistic filter based map matcher. The anonymity controller 121 outputs the anonymized probe data 40, which may be provided to one or more external services 41. Addition, different, or fewer components may be included.

The anonymity controller 121 may be configured to provide anonymity to vehicular trajectory data 32 to ensure privacy even in the publication of the anonymized probe data 40. Even under the constraints of the road network that tend to keep trajectories grouped together along the paths of the roads, the trajectory data 42 may be sparse and uniquely identify the individual, as the sensor information may be noisy and approximate, with device specific noise characteristics. The anonymity controller 121 may perform map matching to infer the original path using the map data 33, which matches the samples to group similar trajectories and aggregate them. The aggregated statistics are used to alter the underlying map data 33 to enforce K-anonymity. The anonymity controller 121 modifies trajectory segments that fail the anonymity property after matching and aggregation, rather than suppressing these trajectory segments. Use of these trajectory segments improves the anonymization process.

The anonymity controller 121 may provide the anonymized probe data 40 to an external service 41. The anonymized data may be reported as a set of data describing locations and time for probes in a geographic area. The external service 41 may be a location based service, which may be executed on a mobile device 122 or vehicle 124. The external service 41 may perform an analysis on the anonymized data in order to identify traffic patterns in the geographic database. Traffic patterns may be reports to other mobile devices 122 or vehicles 124.

The map data 33 include data representing a road network or system including road segment data, or road links, and node data. The road segment data represent roads, and the node data represent the ends or intersections of the roads. The road segment data and the node data indicate the location of the roads and intersections as well as various attributes of the roads and intersections. Other formats than road segments and nodes may be used for the map data 31. The map data 31 may include structured cartographic data or pedestrian routes. The map data 31 may include map features that describe the attributes of the roads and intersections. The map features may include geometric features, restrictions for traveling the roads or intersections, roadway features, or other characteristics of the map that affects how vehicles 124 or mobile device 122 for through a geographic area.

The road network, including road segments and nodes, in the map data 33 may be represented as a two dimensional geometrical arrangement. An arrangement $\mathcal{A}(V,\varepsilon,\mathcal{F})$ is a sub-division of a 2D plane into cells—0-dimensional vertices V, 1-dimensional edges $\varepsilon$ and 2-dimensional faces $\mathcal{F}$ induced by a given set of 2D curves. These cells are jointly represented using doubly connected edge list data structure which maintains the relationship among these cells. The cells have two views: graph view and geometric view. The graph view maintains adjacency information like edges (links) out/in from a given vertex (intersection). The geometric view maintains the geometry of cells similar coordinate position of intersections and information of the links. In particular, the links $\varepsilon$ are planar curves $\mathcal{C}_\varepsilon$ and is approximated by a sequence of line segments $\widehat{\mathcal{C}}_{249}$.

Figure 4:
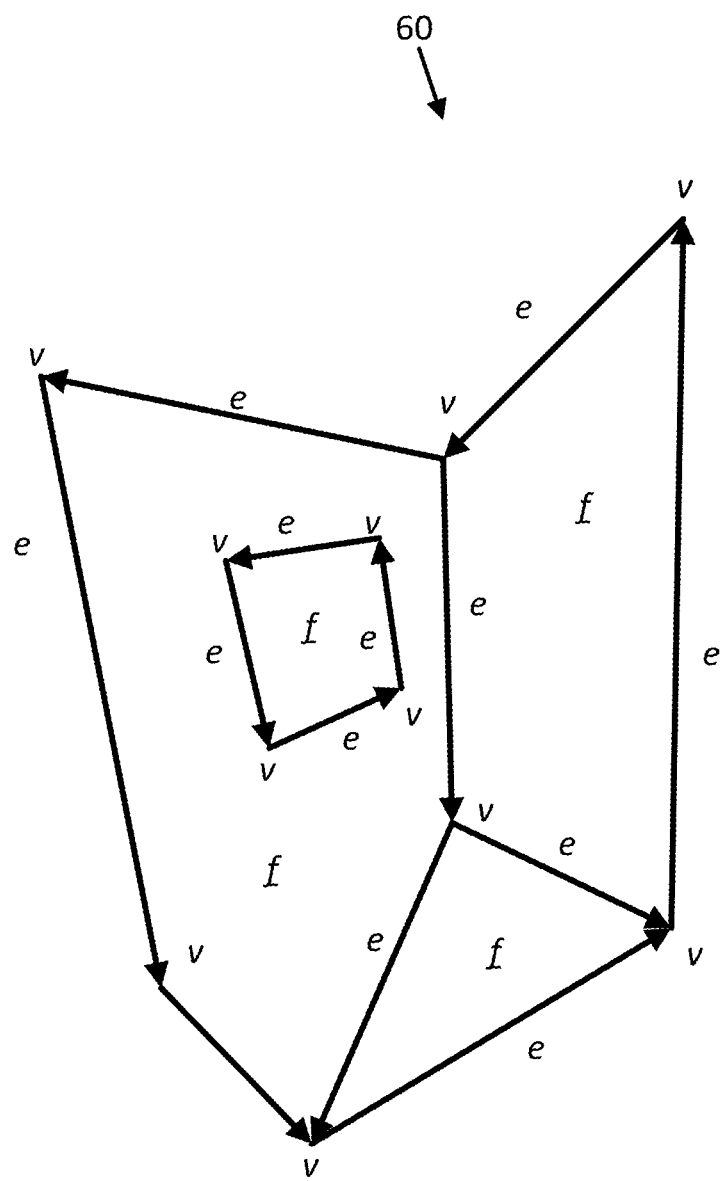
FIG. 4 illustrates an example graph for narrowing candidates in map matching to achieve anonymity in location trajectory data.

FIG. 4 illustrates an example arrangement structure or graph 60 for narrowing candidates in map matching to achieve anonymity in location trajectory data. FIG. 4 includes links e, connecting vertices v, to form faces f. When a set of links e forms a polygon, the interior of the polygon is a face f. The anonymity controller 121 may analyze the trajectory data 32 (e.g., the trajectory in FIG. 2) using the arrangement structure 60.

Figure 5:
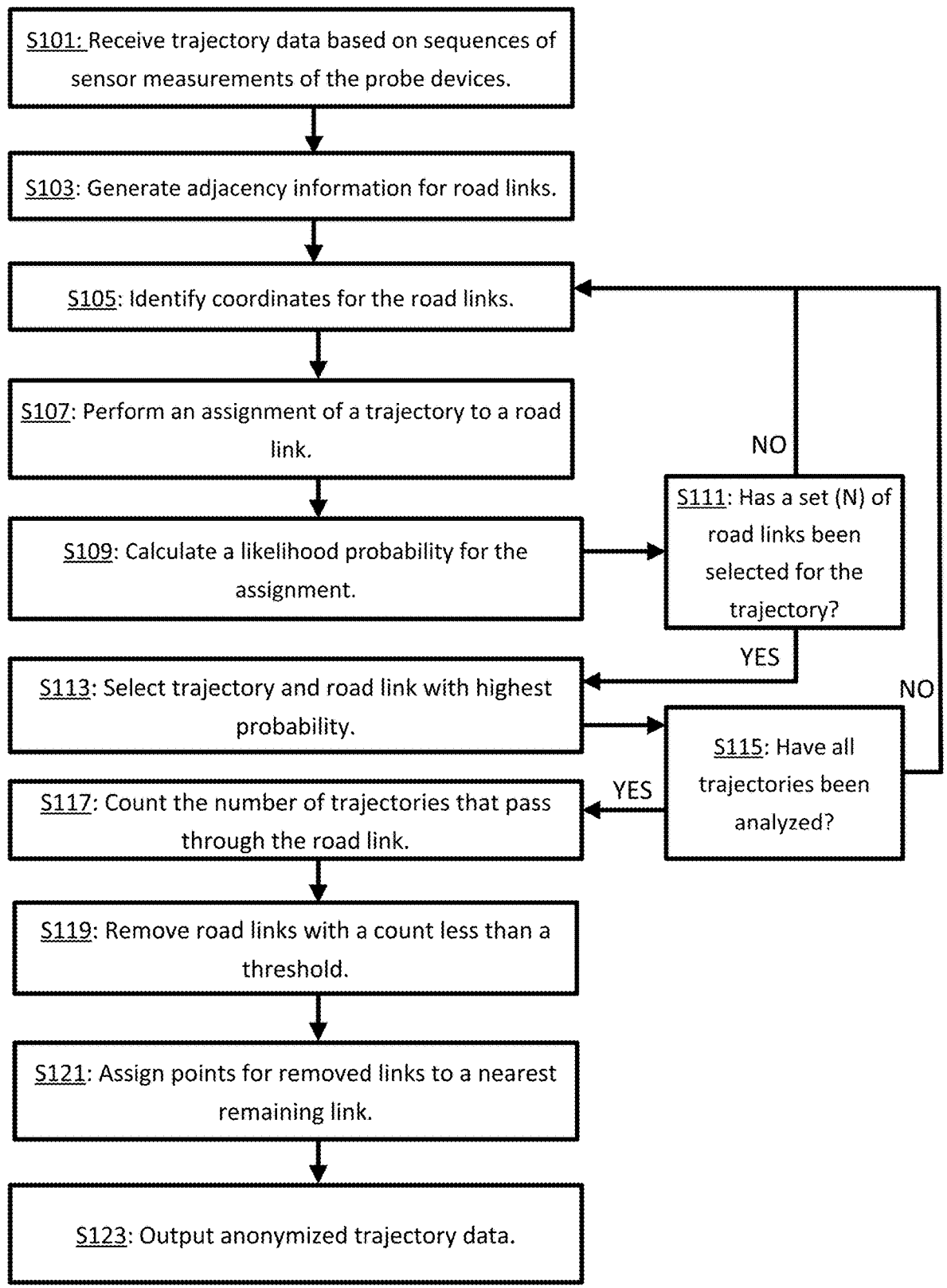
FIG. 5 illustrates a flow chart for map matching to achieve anonymity in location trajectory data.

FIG. 5 illustrates a flow chart for map matching to achieve anonymity in location trajectory data using the anonymity controller 121. The flow chart may include different, additional, or fewer acts. One or more acts may be omitted or repeated. At act S101, the anonymity controller 121 receives probe data from one or more probes 101a-n or the database 123. The probe data includes trajectories as sequences of measurements of the probes. The anonymity controller 121 may use the arrangement structure to efficiently locate one or more trajectory points $(x_i,y_i)$ to the face in the arrangement that contains the point by traversing the graph structure. The containing face may be used to generate possible road links and project the point on these links and create a candidate set for matching.

At act S103, the anonymity controller 121 may generate data representing a map of initial geographic data using cells such that each of the cells includes a plurality of edges and a face. As illustrated by FIG. 4, the graph 60, cells are formed from a series of edges, each of which connect a first vertex to a second vertex. The interior of the cell is the face. The initial geographic data is a predetermined geographic range (e.g., a town, neighborhood, or any set area) that has a list of road links associated with it. The list of road links is modified according to the following embodiments in order to anonymize the trajectory data is associated with the same geographic area.

The anonymity controller 121 through the map matcher 37 performs map matching. Map matching is the process of projecting geographic coordinates from the sensor (e.g., GPS) data $t_u$ on the road network $\mathcal{A}(V,\varepsilon,\mathcal{F})$ such that the reconstructed trajectory $\hat{t}_u$ best represents the observation. Some matching techniques may be classified based on the approach it takes: geometric, graph centric, probabilistic or any combination of these. Geometric techniques use spatial properties like geometric distance, curvature, or other properties to find the closest link. Graph based methods use road connectivity information other than position information to match successive points. An example of road connectivity information may be terminal streets connection to a main road at a "T", intersections, and main roads connecting to each other through roundabouts.

Probabilistic filtering techniques model the underlying uncertainty of the observed signal and jointly find the most likely state sequences (e.g., links or segments) that generated the observation. Other techniques may be based on supervised learning, fuzzy logic, or other examples.

The map matching techniques may be either greedy or jointly optimal, depending on the optimality of the solution. The greedy approach finds the closest link segments for each point, which could be sub optimal, considering the noise in the data source. More optimal techniques jointly assign the entire sequence so that matching is globally optimal. The jointly optimal techniques take advantage of the sub-sequence optimality to build optimal sequences using dynamic programming.

The following is an example joint optimal map matcher that is inspired by a robust map matching framework called path inference filter. The framework is configured to handle both low frequency GPS data and high frequency GPS data. It is based on Bayesian filtering of the trajectory on a noisy channel. The framework can simultaneously handle uncertainty arising from locating each point of the trajectory in a road network and inferring the path taken between successive location points. The path prediction is prominent in low frequency GPS, as there are many possible paths that can connect successive observations.

At act S105, the anonymity controller 121 through the map matcher 37 identifies coordinates for the road links. The coordinates for the road links may be geographic coordinates includes a latitude and a longitude. The coordinates may also include a height or altitude. The road links may be all of the road links in a defined area. The defined area may be the geographic area that is within a predetermined distance from an estimate of the trajectory data. The defined area may be a cell defined in the map data 33. For example, the Earth or a subset of the Earth (e.g., Germany or North America) may be divided in the cells that correspond to a predetermined portion of the Earth or portion thereof. The defined area may be set according to a face in the graph structure of FIG. 4. That is, the anonymity controller 121 may access the graph structure includes a plurality of vertices, define a face interior to a polygon of connected vertices, and identify all of the road links associated with the face. Road links that are associated with the face may be all road link that are entirely within the face of the graph structure. Road links that are associated with the face may be all road link that are at least partially overlapping the face of the graph structure.

At act S107, the anonymity controller 121 through the map matcher 37 performs an assignment of a trajectory to a road link. The anonymity controller 121 may match or assign the trajectory to the closest link. The closest link may be determined by calculating the distance (e.g., Euclidean distance) from the trajectory to all of the selected road links. The anonymity controller 121 may compare the distances to the road links and selects the smallest distance, which is described in more detail below.

In addition or in the alternative to the distances, the anonymity controller 121 may match or assign the trajectory to the curvature of the road link. The anonymity controller 121 may calculate or access curvature values for the selected road links. The anonymity controller 121 may calculate a curvature value for a series of points in the trajectory data. The anonymity controller 121 may approximate a curve for the series of points based on a least squares or regression technique. The curvature of each of the road links is compared to the curvature of the trajectory data and the closest match is selected, which is described in more detail below. In another example, the anonymity controller 121 calculates both distance and curvature, assigns a first weight to the distance, assigns a second weight to the curvature, and selects the road link with the closest distance weighted by the first weight averaged with the closest curvature weighted by the second weight, which is described in more detail below.

At act S109, the anonymity controller 121 through the map matcher 37 calculates a likelihood probability for the assignment. The likelihood probability may be an absolute value based on the absolute difference in distance and/or curvature between the trajectory data and road link. The likelihood probability may be a relative value based on other road link comparison that have taken place.

At act S111, the anonymity controller 121 through the iteration processor 39 determines whether all of the road links in a set N have been selected and analyzed in S107 and S109. The set N may be all road links in the selected geographic area. The set N may be the road links in an area corresponding to the trajectory data. When all of the road links in the set N have been analyzed, the process proceed to S113. When all of the road links in the set N have not been analyzed, the process returns to S105, and S105, S107, and S109 are repeated.

At act S113, the anonymity controller 121 through the map matcher 37, selects the trajectory with the highest probability. The map matcher 37 may calculate a first probability for the trajectory data and a first road link and calculate a second probability for the trajectory data and a second road link. The map matcher 37 compares the first probability and the second probability. This may be repeated for any number of road links.

While not illustrated, at act S109 or S111, the anonymity controller 121 may store the initial probability in memory, or a register. At further iterations, the anonymity controller 121 may compare the current probability to the memory at replace the stored value is the current value is higher. At act S113, the anonymity controller 121 may access this stored value.

At act S115, the anonymity controller 121 through the iteration processor 39 determines whether all of the trajectories have been analyzed. The anonymity controller 121 may maintain a count of the analyzed trajectories. When all of the trajectories have been analyzed, the anonymity controller 121 proceeds to act S117. When not all of the trajectories have been analyzed, the anonymity controller 121 returns to S105 to repeat at least S105-S113 until all of the trajectories have been analyzed.

Figure 7:
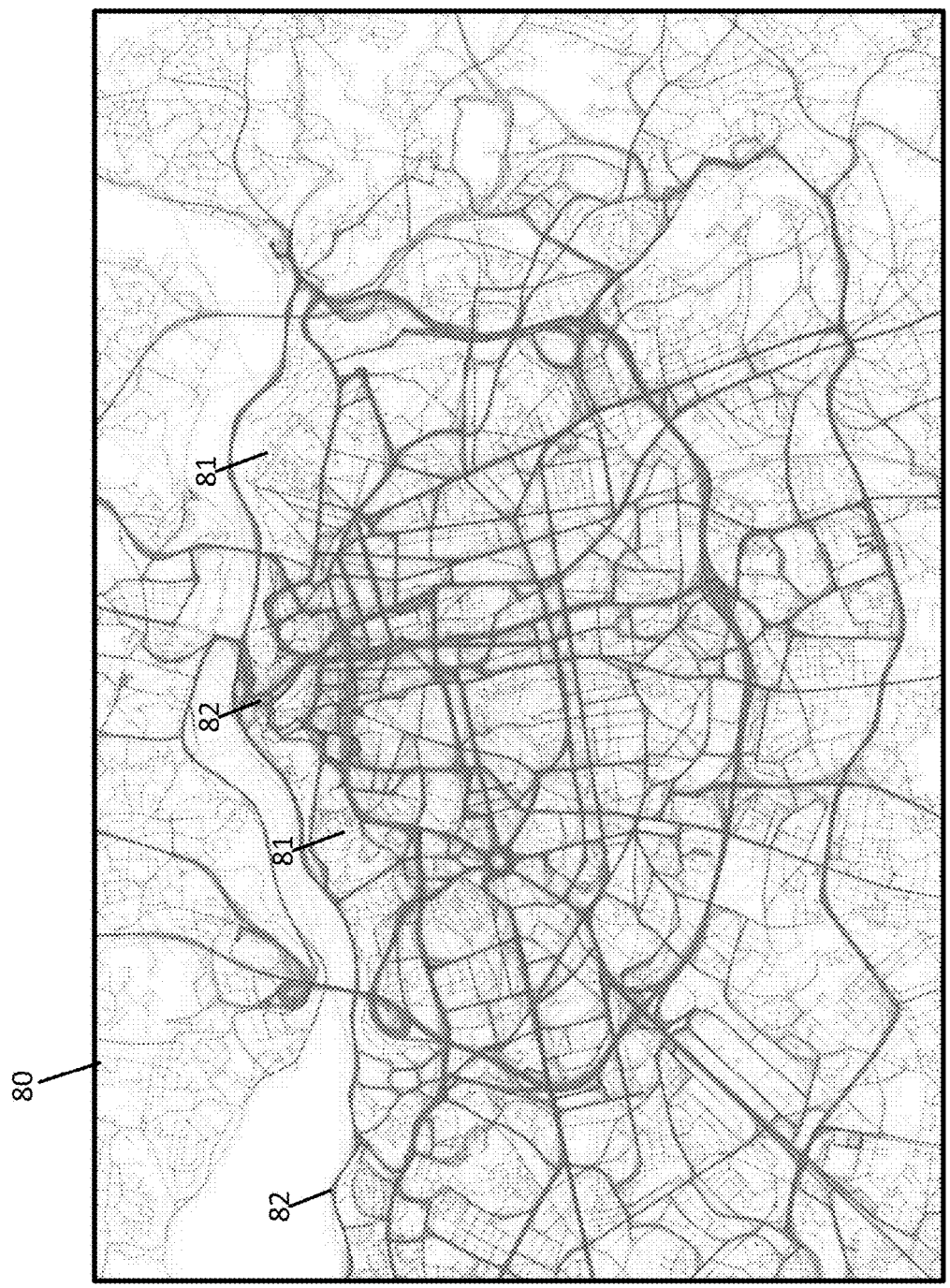
FIG. 7 illustrates an example of map matched trajectories

FIG. 7 illustrates a set of data 80 including map matched trajectories. Data 80 illustrates that not all of the road links have been matched to trajectories. The lighter lines 81 correspond to the road link and the darker lines 82 correspond to the map matched trajectories.

Figure 6:
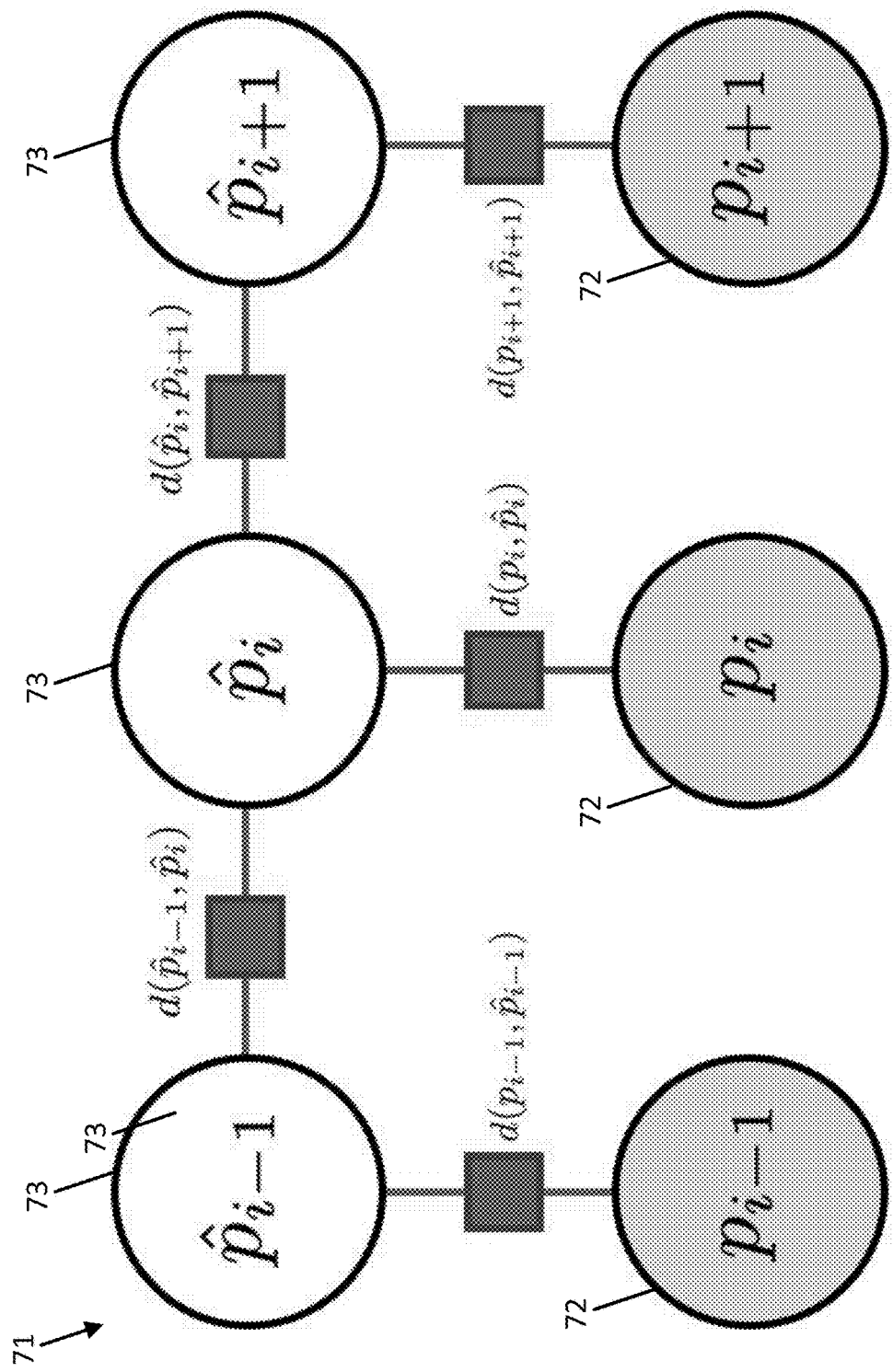
FIG. 6 illustrates an example factor graph of map matching.

Another, more detailed technique for map matching is described with respect to FIG. 6. The path information is described with spatial closeness of successive points. Given a sequence of location observations $t_u=<(x_1,y_1) \ldots (x_n,y_n)>$, the objective is to find $\hat{t}_u=<(\hat{x}_1,\hat{y}_1) \ldots (\hat{x}_n,\hat{y}_n)>$ such that likelihood of $\mathbb{P}(t_u|\hat{t}_u)$ is maximized, given that $\forall (\hat{x}_i,\hat{y}_i):(\hat{x}_i,\hat{y}_i) \in \mathcal{C}_\varepsilon | \exists \mathcal{C}_\varepsilon \in \mathcal{A}(V,\varepsilon,\mathcal{F})$. Hence the joint optimal assignment provides that each point is assigned to a point in one of the road link curves, so that the likelihood score is maximized. With equal prior assumption of the road links, the maximum likelihood estimation is equivalent to maximum a posteriori estimate of $\mathbb{P}(\hat{t}_u\alpha|t_u)$. Exact computation and maximization is intractable given the combinatorial nature of the state sequences.

The state sequences may be factorized by modeling as undirected graphical model such as a conditional random field (CRF). CRF is a statistical modeling technique with a classifier that predicts classification for a single point without considering neighboring points.

The factor graph 71 may be stored in factor graph table 34 by listing coordinates of vertices and edges in terms of vertices (e.g., an edge extends from a first vertex to a second vertex). In factor graph 71, nodes 72 represent observation points $p_i=(x_i,y_i)$, and nodes 73 represent predicted point in the sequence $\hat{p}_i$ and the factor edges connecting the nodes is a function of distance between the points $d((x_i,y_i), (x_j,y_j))$. The factor graph may be a linear chain connecting observation with underlying state or adjacent state variables. Given the observation sequence $t_u$, the factor graph 71 so that each possible assignment $\hat{t}_u^c$ gets a score: $f(\hat{t}_u^c)=\Sigma_{i=1}^n d((x_i,y_i),(\hat{x}_i^c,\hat{y}_i^c))+d((\hat{x}_{i-1}^c,\hat{y}_{i-1}^c),(\hat{x}_i^c,\hat{y}_i^c))$. As CRF is a log-linear model, the probability of such an assignment is $$\propto e^{f(\hat{t}_u^c)}.$$

The anonymity controller 121 is configured to calculate $\hat{t}_u=\text{argmin } f(\hat{t}_u^c)$ in order to maximize the likelihood probability. The value for $\hat{t}_u$ can be calculated using dynamic programming. Dynamic programming takes advantage of the sub structure optimality and efficiently computes $\hat{t}_u$ using recurrence relation. In this case, $\hat{t}_u[1:1]$ is efficiently computed using the precomputed and stored optimal value for the subsequence $\hat{t}_u[1:n-1]$. Because the CRF model is not parameterized—the factors are unit weighted, and the anonymity controller 121 may omit a learning algorithm for the parameters.

Even under this technique, estimatinet $\hat{t}_u$ is computationally intensive, because the anonymity controller 121 enumerates all possible $(\hat{x}_i,\hat{y}_i) \in \mathcal{C}_\varepsilon$. The anonymity controller 121 may utilize one or more approximation calculations to reduce the computational resources (e.g., bandwidth, processing cycles, and/or memory space) required for the anonymization process, or more specifically, for the probability likelihood comparisons. A reduction of the computational resources may also result in an increased processing speed for the anonymization of the trajectory data.

The anonymity controller 121 may utilize an approximation that reduces the number of points considered in a curve $C_\varepsilon$, instead of all the points in a curve. One or more curves may be approximately represented as set of line segments, the number of points is reduced from infinitely many to one point per segment (e.g., a starting point). Even under this assumption, the number of points is huge given the number of such links (curves) in the road network. So, to reduce the state space by considering only the closest point, instead of all the segment points. The anonymity controller 121 may select $(\hat{x}_i, \hat{y}_i)$ as possible state for $C_\varepsilon$ at i because $\forall (\hat{x}_i^c, \hat{y}_i^c) \in C_\varepsilon : d((x_i,y_i), (\hat{x}_i^c, \hat{y}_i^c)) \geq d((x_i,y_i), (\hat{x}_i, \hat{y}_i))$.

In addition or in the alternative, the anonymity controller 121 may utilize an approximation that narrows down or filters the candidate set of curves for each time instance. The anonymity controller 121 may sort the trajectory data according to a timestamp and filter the trajectory data to the face that includes at least one point of the trajectory data. Not all the curves may be highly probable for a given observation $(x_i, y_i)$. As a result of the anonymity controller 121 only considering the set of curves $\{C_{249}^i | \varepsilon \in \mathcal{F} \cap (x_i, y_i) \in \mathcal{F}\}$ that enclose the given point may be sufficient. As for all other curves in the arrangement, it is possible to find a curve in the candidate set that is closer to the point than the curve. The anonymity controller 121 may identify such set of curves by locating the face that contains the given observation point. It is possible to locate such a face in logarithmic time $O(\log(|\mathcal{A}(V,\varepsilon,\mathcal{F})|))$ with appropriate indexing techniques. The space may be partitioned into two subspaces to find the closest face. Accordingly, a logarithmic trend is followed with respect to the number of faces, edges, or vertices in the arrangement.

The anonymity controller 121 locates the closest face $\mathcal{F}$ for each point and enumerates all curves $\{C_\varepsilon^i\}$ that enclose the face. Then closest point $(\hat{x}_i^c, \hat{y}_i^c)$ for each curve in $\{C_\varepsilon^i\}$ is found along with the distance $d((x_i,y_i), (\hat{x}_i^c, \hat{y}_i^c))$. Hence by repeating the process for entire sequence $t_u$, a sequence of candidate sets $<\{C_\varepsilon^i\}>$ is provided. The anonymity controller 121 may further select one element for each i in the sequence so that $f(\cdot)$ is maximized by dynamic programming. The assignment $\hat{t}_u$ that gets the maximum score is considered as optimal prediction and is returned along with the edges that they belong to $<\varepsilon^i>$.

The map matcher returned edge list might be discontinuous, with low frequency observations and this might give lead to false negative edges, i.e. instances at which the vehicle remained dormant without emitting signal, all throughout the road link. To account these edges without corresponding observations, the anonymity controller 121 perform path completion of successive edges. For each $[\varepsilon^{i-1}, \varepsilon^i]$, the anonymity controller 121 calculates the edges in between that forms the shortest path connecting $\varepsilon^{i-1}$ to $\varepsilon^i$. Hence taken together, the anonymity controller 121 provides a sequence including all edges $<\varepsilon^i>$ corresponding to a road link that the vehicle might have traversed. As described above, the anonymity controller 121 through the map matcher 37, repeats the map matching technique to find most probable edge sequence for each trajectory.

At act S117, the anonymity controller 121 through the aggregation calculator 38 counts or calculates the number of trajectories that pass through a particular road link to calculate an aggregate score. The aggregation calculator 38 is an aggregation calculator configured to calculate a number of trajectories in the trajectory data that passes through each of the plurality of edges. Given the edge sequence for each trajectory, the AC may aggregate or count the number of trajectories passing through the given edge. The aggregation calculator 38 may include a counter that is increment according to the count.

At act S119, the anonymity controller 121 compares the count in act S117 to a threshold value K. The aggregation calculator 38 is an aggregation calculator configured to compare the number of trajectories in the trajectory data for at least one of the plurality of edges. When the count, or aggregate score, is less than the threshold K, the associated road link is removed. This will remove road links that have insufficient support counts, removing sparse regions in the map. This also alters the underlying map data. That is, because the road link is removed, the map data is modified. The anonymity controller 121 removes the road link from the geographic data in response to the comparison of the number of trajectories in the trajectory data for the at least one of the edges.

At act S121, the anonymity controller 121 assigns points for removed road links to a nearest remaining link. The trajectory data includes orphans as points that are not assigned to a road link. The anonymity controller 121 reassigns these points by rerunning the map matcher on the modified map. For example, the anonymity controller 121 may identify an adjacent road link closest to the removed road link through map matching and assign at least one point from the removed road link to the adjacent road link.

The iteration calculator 39 may control additional iteration of the process. The iteration calculator 39 may repeat acts S109-S121, or more generally the acts of matching, aggregation and anonymization, together multiple times until no further links are removed in act S121. In practice, convergence may occur in two or three iterations.

In one alternative, the iteration calculator 39 determines one or more stopping criteria for stopping the additional iterations of the process. The one or more stopping criteria may include a fixed number of iterations. For example, the number of times to repeat the aggregation of trajectories and removal of road links. Examples for the number of times may be 2, 3, 4, 5, 10, or 20. The iteration calculator 39 may increment an iteration count i (e.g., i=i+1). When the iteration count is less than the number of times to repeat the aggregation of trajectories and removal of road links, the stopping criterion is not met and the process proceeds to S105 to repeat some combination of S107, S109, S111, S113, S115, S117, S119, and S121. When the difference equals the number of times to repeat the aggregation of trajectories and removal of road links, the stopping criterion is met and the process proceeds to S123.

Figure 8:
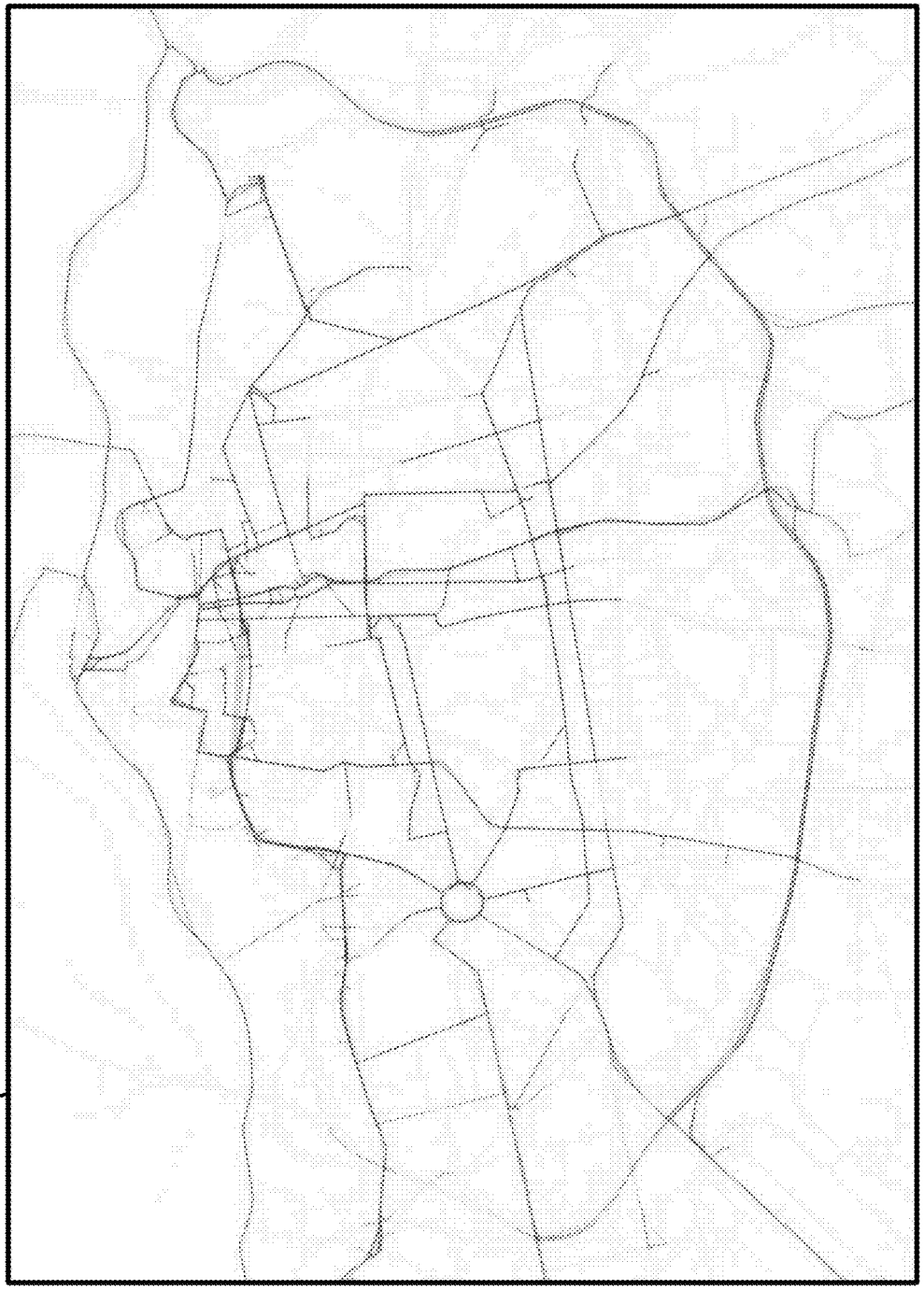
FIG. 8 illustrates an example anonymized data.

At act S123, the anonymity controller 121 outputs anonymized trajectory data as anonymized probe data 40. The anonymity controller 121 modifies the geographic data in response to the comparison of the number of trajectories in the trajectory data for the at least one of the edges. The anonymized probe data 40 may be a modified graph arrangement that only has edges with support counts greater than K, ensuring K-anonymity at the point level. The anonymized probe data 40 may be a modified version of map data 33. The map data 33 may include all road links in a region, and the anonymized probe data 40 is a subset of the map data 33, including those road links that are not removed in S119. FIG. 8 illustrates a map 90 illustrating the aggregation based anonymization of the road network. FIG. 8 includes many fewer road links than FIG. 7. The anonymized road network (anonymized probe data 40) may be stored and communicated as a series of road links defining by starting points and ending points in geographic coordinates. The anonymized road network (anonymized probe data 40) may be stored and communicated as a list of identifiers for the remaining road links. An identifier for the road link may be an alphanumeric series of values that describes the road link according to a geographic database. The anonymity controller 121 may output anonymized trajectory data includes a list of links for the modified geographic data including fewer links than the map of the initial geographic data.

More specifically, the anonymity controller 121 may generate a message or a database including the locations for the remaining road links. The anonymized data 40 may be a set of data provided to a location based application for a mobile device 122 or other computer. The anonymized data 40 may provided for analysis by the server 125 in providing the location based application.

For example, the external service 41 may be a navigation application or mapping application in which routing or positioning information is provided to the mobile device 122. The location of the mobile device 122 may be anonymized before being sent to the server 125 and location based features in the navigation or mapping application may be provided to the user based on the anonymized data. Similarly, information on other users such as the number of visits to one or more POIs, or the most traveled path of a route may be provided to the mobile device 122 based on the anonymized data of the other users.

In another example, the external service 41 may be a traffic provider. The traffic information such as the real time average speeds on or more road segments may be determined from the anonymized data 40. The anonymized data 40 may also be provided to the mobile device 122 after the location of the mobile device has been anonymized.

In another example, autonomous driving or assisted driving applications may utilize the anonymized data 40. The external service 41 may be a remote service that controls or provides instructions to autonomous vehicles or assisted driving vehicles. Routes may be provided to these vehicles based on other routes traveled and included in the anonymized data 40.

The aggregation and anonymization techniques described above only ensures K-anonymity at point level, but K-anonymity of the entire sequence of points may also be achieved. This requires efficient counting of the point sequence to enforce the criteria. The anonymity controller 121 may utilize prefix tree structure to maintain the counts of the sub-sequence and transform the prefix tree in such a way that exact counts of the entire trajectory is at least K anonymous.

The anonymity controller 121 may define a prefix tree as an ordered data structure that can efficiently manipulate sequential data composed of homogeneous elements. Each node $N(E,\{(N_s,V_s)\}_1^S)$ contains an element and maps to successive elements [1,S] in the sequence along with associative values $V_s$, starting from the node. Hence a given node along with its parent corresponds to a subsequence in the input data. Prefix tree may be used as an associative data structure with the value V as the occurrence count. For example, a prefix tree built out of a sequence $<p_1,p_2,p_3>$ will have $N(p_1)$ as root node and $N(p_2)$ as child of $N(p_1)$ and so on.

The anonymity controller 121 may perform, using the prefix trees, a partial search of subsequence and using the count to segment a given sequence into set of subsequences. Each trajectory $t_u$ is considered as a sequential data, where points (x,y,t) in the trajectory corresponds to elements is the prefix tree.

The segmentation may include tree construction, count based tree trimming and splitting the trajectory using trimmed tree. In tree construction, each trajectory is sequentially inserted into the tree starting from the root node and traversing the tree to insert each point into appropriate node. If a point is already present at a given level, its count is incremented.

In count based trimming and balancing, the tree is modified. The tree structure may be long and skinny given the sparseness of the trajectories dataset. Hence, for an optimal segmentation, it has to cut-off on levels with counts lower than K and the trimmed portion has to be re-inserted to make sure that it is considered as a separate sub-trajectory. The trimming and re-insertion is carried out until the trimmed nodes at successive iterations are identical. In such a case, it is not possible to optimize the tree further and hence considered as a stopping criterion.

In segmentation, after the prefix tree is optimized by trimming and re-inserting, the given trajectory $t_u$ is segmented by doing a partial search sequentially on the tree. When it reaches a leaf node at level l, it signifies that the support count for next point $(x_{l+1},y_{l+1},t_{l+1})$ in the sequence is lower than K in the original data and hence the subsequence until the given point $<(x_1,y_1,t_1) \ldots (x_l,y_l,t_l)>$ is considered as a separate trajectory. It should be noted that the count of sub-trajectory is at least K, based on the prefix tree. Thus the $t_u$ is splitted into two sub trajectories: $<(x_1, y_1,t_1) \ldots (x_l,y_l,t_l)>$ and $<(x_{l+1},y_{l+1},t_{l+1}) \ldots (x_n,y_n,t_n)>$. Now, the sub-trajectory $<(x_{l+1},y_{l+1},t_{l+1}) \ldots (x_n,y_n,t_n)>$ is considered as a new trajectory and a partial search is performed for this sub-trajectory. The splitting and partial searching is performed until end of points is reached for the given trajectory.

Figure 9:
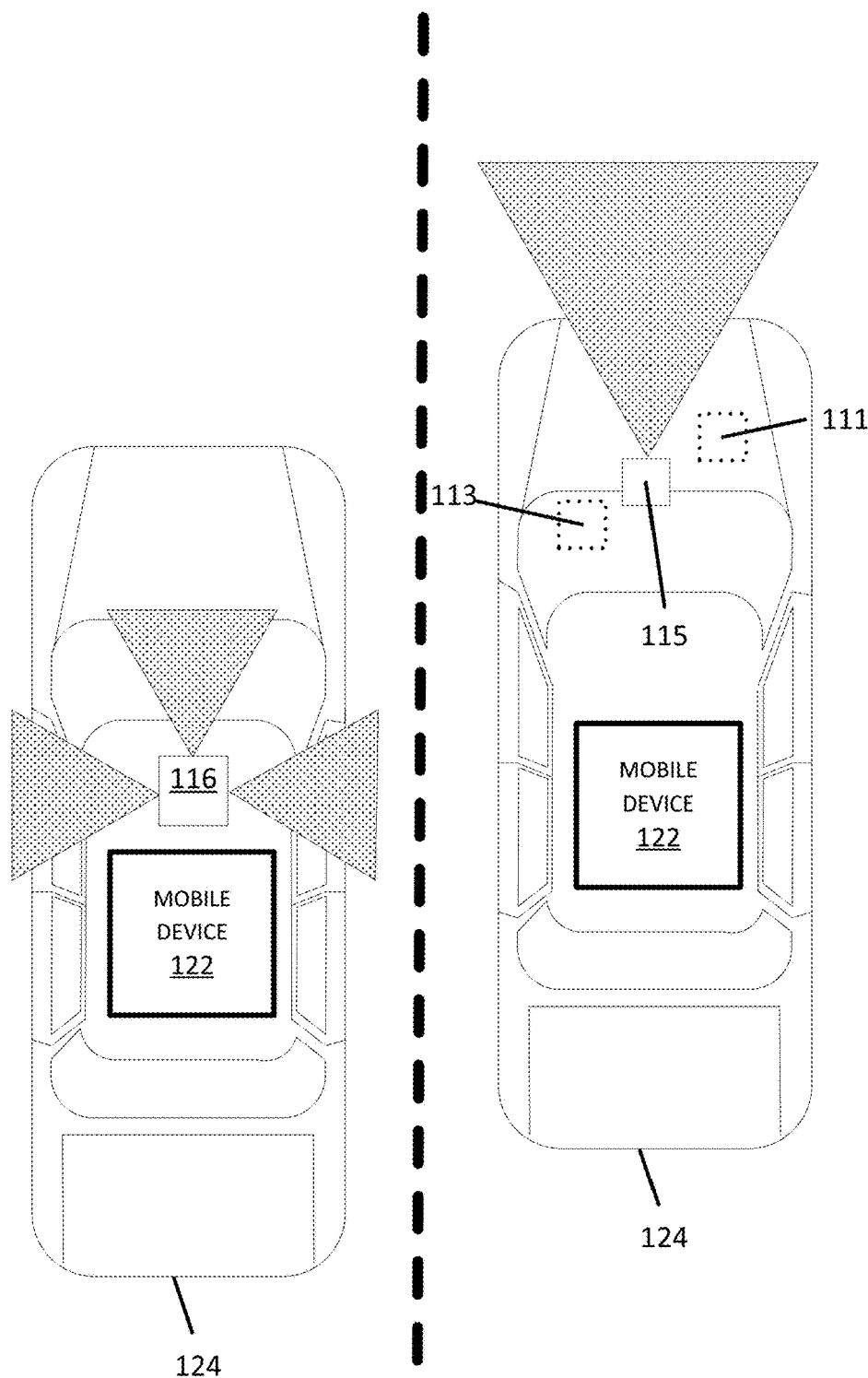
FIG. 9 illustrates exemplary vehicles of the systems of FIG. 1.

FIG. 9 illustrates an exemplary vehicle 124 of the system of FIG. 1. The vehicles 124 may include a variety of devices that generate trajectory data. The trajectory data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway. The distance data detection device may generate the trajectory data. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the anonymized data 40 or other geographic data received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to the anonymized data 40 or other geographic data received from geographic database 123 and the server 125 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to the anonymized data 40 or other geographic data received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the anonymized data 40 or other geographic data received from geographic database 123 and the server 125 and driving commands or navigation commands.

Figure 10:
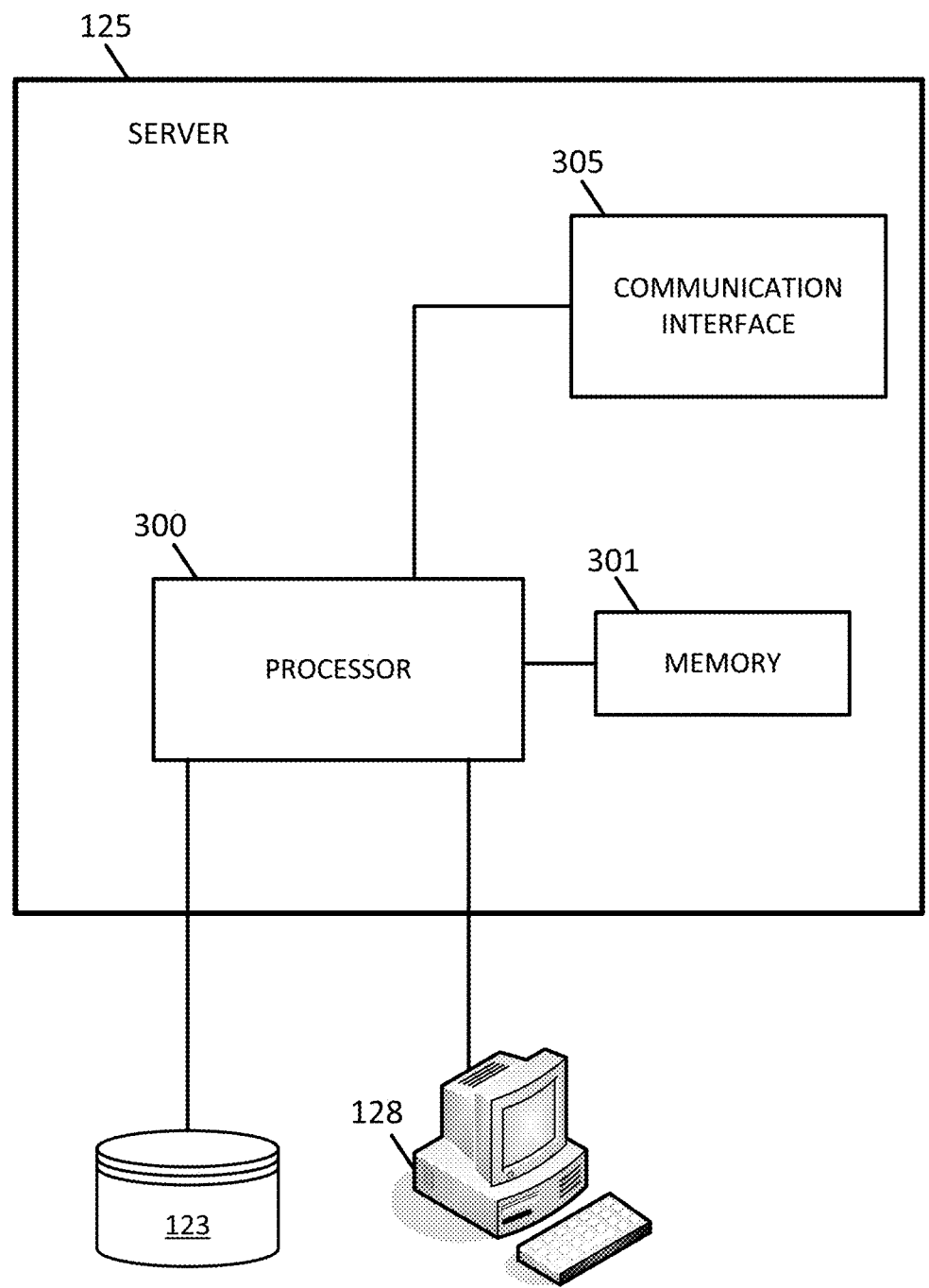
FIG. 10 illustrates an example server.

FIG. 10 illustrates an example server 125, which may apply to the system of FIG. 1. The server 125 includes a processor 300, a communication interface 305, a memory 301, and a database 123. The processor 300 may implement the functions associated with the anonymity controller 121 including the map matcher 37, the aggregation calculator 38, and the iteration calculator 39. The memory 301 may store the trajectory data 32 and the map data 33. In some examples, the memory 301 may store the factor graph table 34 or a table for another type of map matcher. The communication interface 305 may facilitate the receipt of the probe data from the probes 101$a$-$n$ as well as provide the anonymity data 40 to the external device 41. An input device (e.g., keyboard or personal computer 128) may be used to enter settings to the server 125. The settings may include settings for thresholds and other user preferences described herein. Additional, different, or fewer components may be provided in the server 125.

Figure 11:
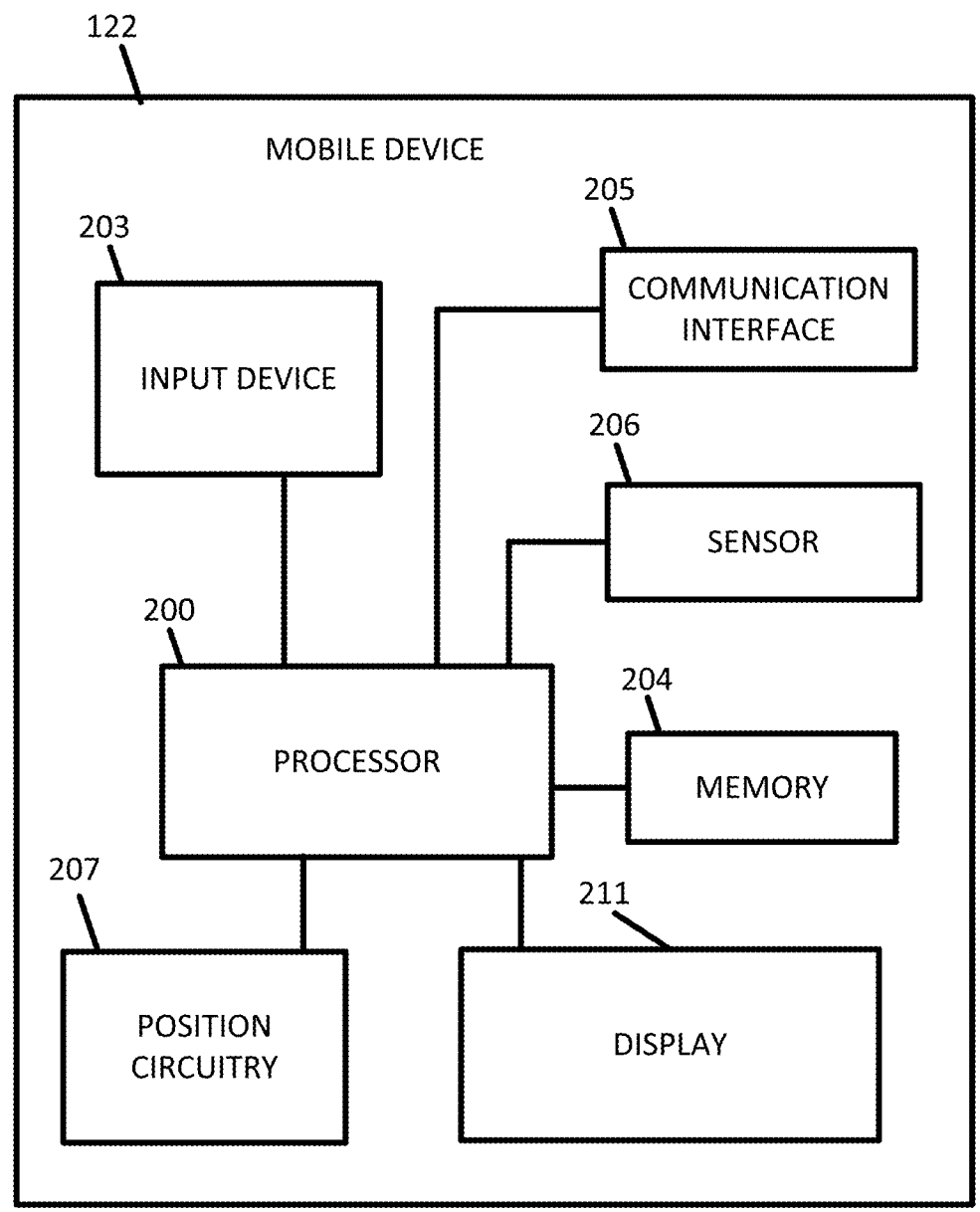
FIG. 11 illustrates an example mobile device.

FIG. 11 illustrates an exemplary mobile device 122 of the system of FIG. 1. The mobile device 122 includes a processor 200, a memory 204, an input device 203, a communication interface 205, position circuitry 207, a display 211, and a sensor 206. The input device 203 may receive commands from the user for default settings for the aggregation techniques. The default settings may include map matcher settings for assigning trajectory data to road links and aggregation setting including the removal threshold. The default settings may include iteration technique or iteration threshold. The settings may include anonymity levels or thresholds.

The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include a camera, a LiDAR device, or another sensor described herein. The sensor 206 may detect congestion local to the mobile device 122. The sensor 206 may detect when an intersection is approaching. Additional, different, or fewer components are possible for the mobile device 122.

Figure 12:
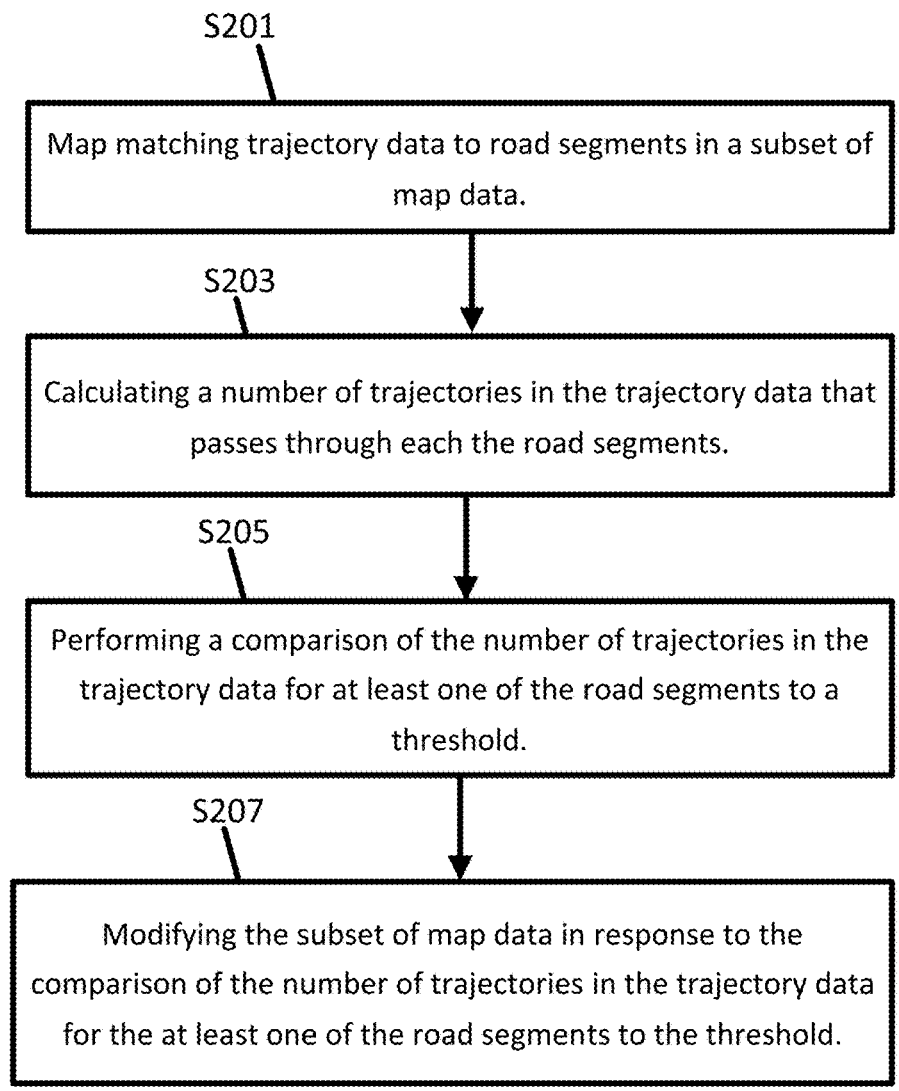
FIG. 12 illustrates an example flow chart for the operations of the server and/or the mobile device.

FIG. 12 illustrates a flowchart for the operation of mobile device 122 or the server 125. Additional, different, or fewer acts may be provided.

In one example, the mobile device 122 collects the trajectory data using the position circuitry 207. The position circuitry 207 or the processor 200 detects a geographic position of the mobile device 122 or the vehicle 124. The position circuitry 207 is one example means for detecting or determining a geographic position. The processor 200 may also include circuitry serving as means for detecting or determining a geographic position. The detected geographic position of the mobile device 122 may include a latitude and longitude pair. The geographic position may be detected or sampled at periodic intervals in time or distance or may be continuously detected. The sensor 206, which may include distancing sensors, range sensor, image sensors, or another sensor as described with respect to FIG. 20 may also provide information for determining the geographic position of the mobile device 122.

Either the mobile device 122 or the server 125 performs the acts of FIG. 12. The resulting anonymized data may be provided back to the mobile device 122 or other mobile devices 122 for the location based service.

At act S201, the processor 200 or the processor 300 map matching trajectory data to road segments in a subset of map data. The subset of map data may be a geographic area that is under inspect. The subset may be selected from a user input (e.g., from input device 203). The subset may be selected as part of a section of an entire geographic region that is analyzed section by section. The subset may be selected according to the underlying map data. That is, the subset may be larger for sparse map data (e.g., road segments) and smaller for denser map data. The subset may follow political lines for a city, county, or country. Map matching the trajectory data may include determining a geometric relationship between one or more points in the trajectory data and the road segments in the subset of map data. The geometric relationship may be based on distance, curvature, or other properties of the map data. The geometric relationship may be based on a combination of distance, curvature, and other properties of the map data.

The processor 200 or the processor 300 may include a map matching module including an application specific module or processor that map matches the trajectory data to the road segments. The map matching module is an example means for map matching trajectory data to road segments in a subset of map data.

At act S203, the processor 200 or the processor 300 calculates a number of trajectories in the trajectory data that passes through each of the road segments. The trajectories data may be simplified to represent a point or group of points. The point or group of point is compared to each of the road segments in the subset off data, and if matched, a count is incremented.

The processor 200 or the processor 300 may include an aggregation module including an application specific module or processor that counts the trajectories for individual road segments. The aggregation module is an example means for calculating a number of trajectories in the trajectory data that passes through each of the plurality of road segments.

At act S205, the processor 200 or the processor 300 is configured to perform a comparison of the number of trajectories in the trajectory data for at least one of the road segments to a threshold. The threshold is a count threshold or removal threshold. The threshold may be provided by user input from input device 203. The threshold may be based on properties of map data. In regions with denser map data (e.g., a high number of road segments per unit area), the threshold is a dense map threshold. In regions with sparser map data (e.g., a low number of road segments per unit area), the threshold is a sparse map threshold. The dense map threshold may be greater than the sparse map threshold. Examples for the threshold include 2, 5, 10, 30, 100, or another value.

The processor 200 or the processor 300 may include a comparator module including an application specific module or processor that performs a comparison of the number of trajectories in the trajectory data for at least one of the road segments to a threshold. The comparator module is an example means for performing a comparison of the number of trajectories in the trajectory data for at least one of the plurality of road segments to a threshold.

At act S207, the processor 200 or the processor 300 modifies the subset of map data in response to the comparison of the number of trajectories in the trajectory data for the at least one of the road segments to the threshold. The subset of map data may be modified by removing road segments that are associated (or matched) with less trajectory data than the threshold. The modified may data may be anonymized data and suitable to represent the original trajectory data with anonymity.

The processor 200 or the processor 300 may include a map modification module including an application specific module or processor that modifies the subset of map data in response to the comparison of the number of trajectories in the trajectory data for the at least one of the road segments to the threshold. The module is an example means for modifying the subset of map data in response to the comparison of the number of trajectories in the trajectory data for the at least one of the plurality of road segments to the threshold.

The processor 200 or the processor 300 may perform one or more location based services based on the modified map data with road segments removed based on the analysis of the trajectory data. Traffic values may be estimated from the modified map data. The processor 200 or 300 may include a routing module including an application specific module or processor that calculates routing between an origin and destination based on the modified map data. The routing module is an example means for generating a route in response to the anonymized data 40 to the destination. The routing command may be a driving instruction (e.g., turn left, go straight), which may be presented to a driver or passenger, or sent to an assisted driving system. The display 211 is an example means for displaying the routing command. The mobile device 122 may generate a routing instruction based on the anonymized data 40.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device 122 through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle.

The restrictions for traveling the roads or intersections may include turn restrictions, travel direction restrictions, speed limits, lane travel restrictions or other restrictions. Turn restrictions define when a road segment may be traversed onto another adjacent road segment. For example, when a node includes a "no left turn" restriction, vehicles are prohibited from turning left from one road segment to an adjacent road segment. Turn restrictions may also restrict that travel from a particular lane through a node. For example, a left turn lane may be designated so that only left turns (and not traveling straight or turning right) is permitted from the left turn late. Another example of a turn restriction is a "no U-turn" restriction.

Travel direction restriction designate the direction of travel on a road segment or a lane of the road segment. The travel direction restriction may designate a cardinal direction (e.g., north, southwest, etc.) or may designate a direction from one node to another node. The roadway features may include the number of lanes, the width of the lanes, the functional classification of the road, or other features that describe the road represented by the road segment. The functional classifications of roads may include different levels accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

Figure 13:
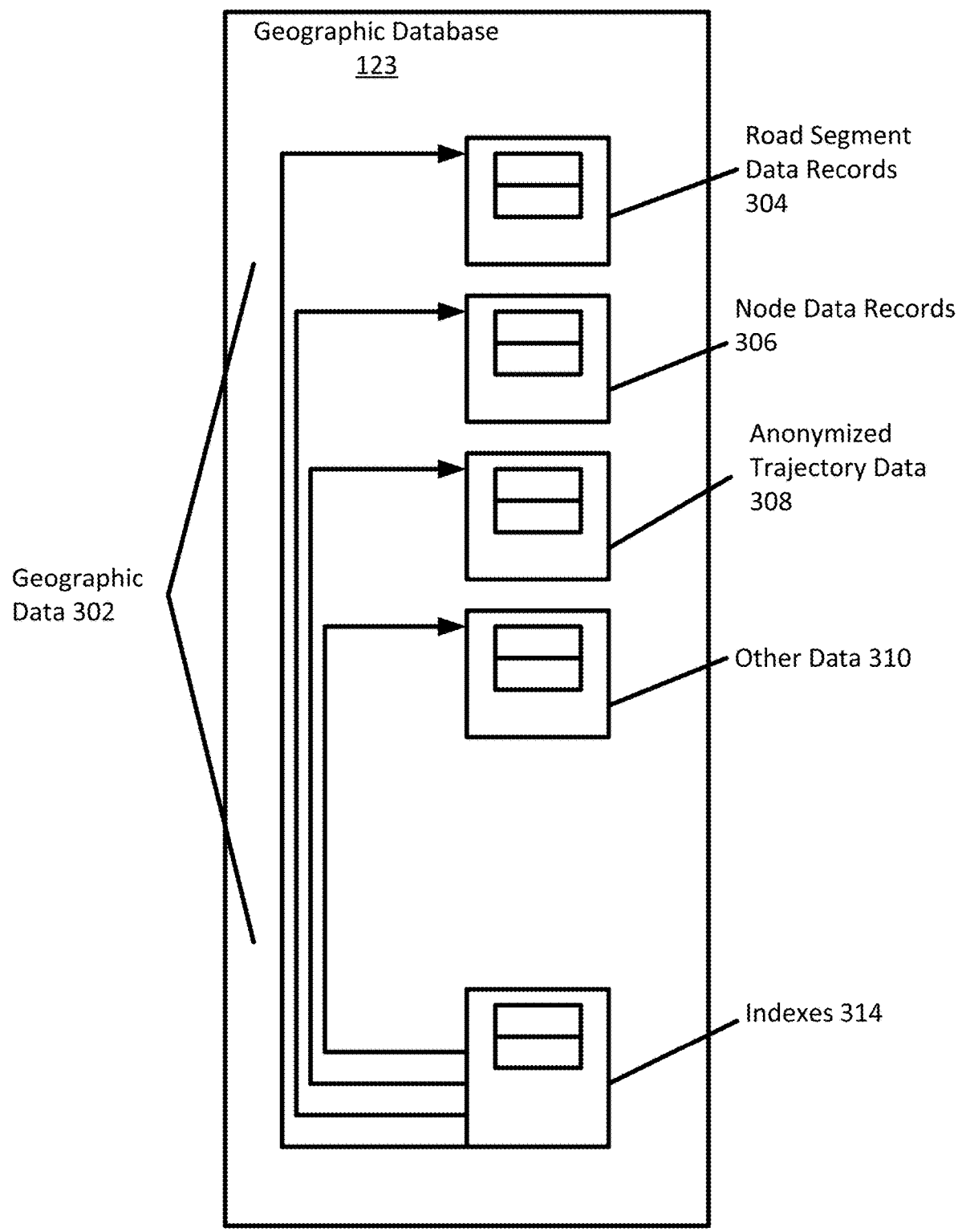
FIGS. 13 and 14 illustrate example geographic databases.

In FIG. 13, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate anonymized trajectory data 308 with a road segment in the segment data records 304 or a geographic coordinate. An index 314 may, for example, store anonymized trajectory data 308 relating to one or more trajectories that have been anonymized using the embodiments described herein. The database 123 may also include the map data 33 and/or the factor graph table 34.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 14:
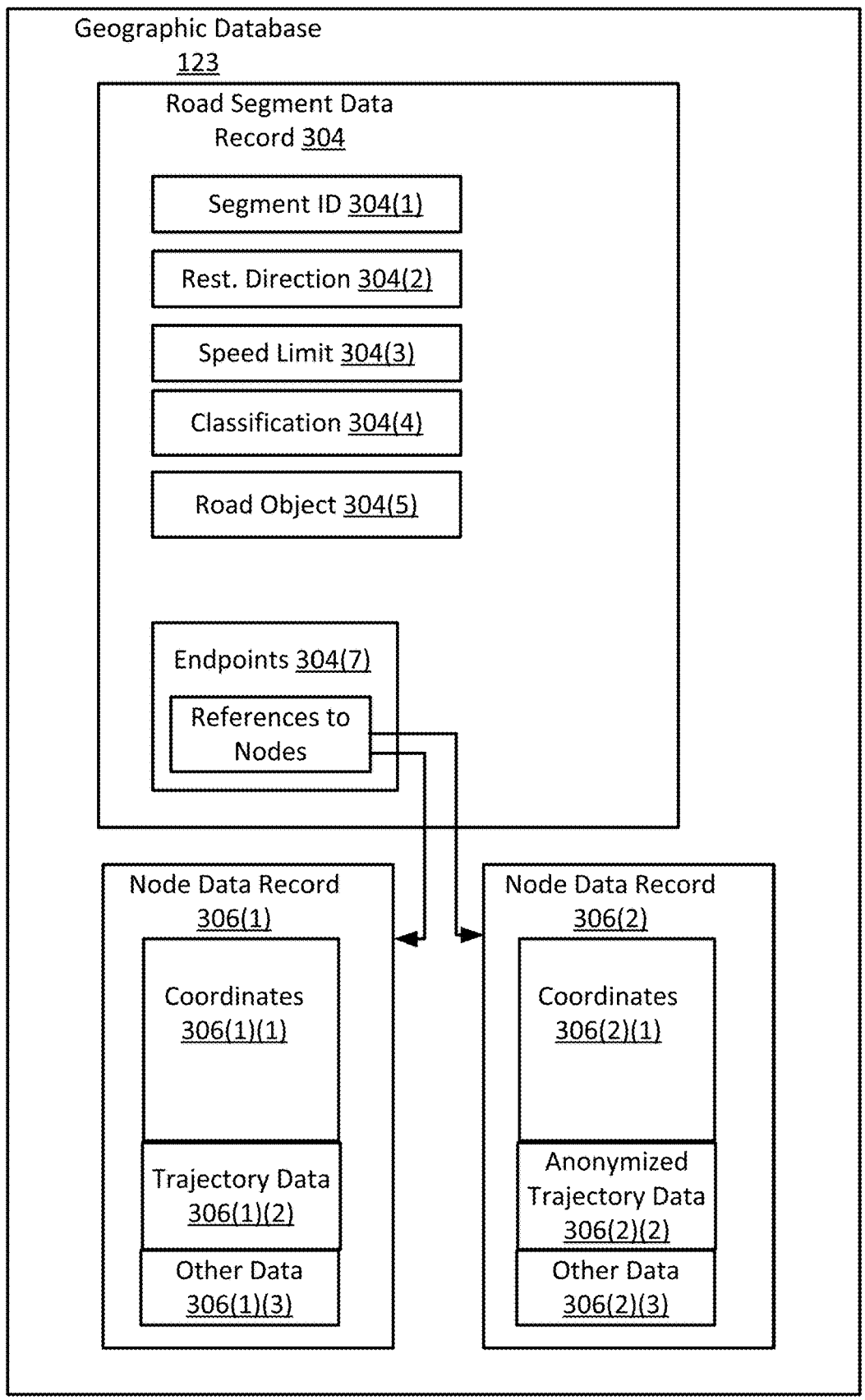

FIG. 14 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 14 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, including trajectory data 306 (1)(2), which may include the original geographic coordinates for the trajectory data and/or anonymized trajectory data 306(2)(2), which may include the trajectory data that is associated with the node after one or more of techniques described herein are performed. The trajectory data 306 (1)(2) and the anonymized trajectory data 306(2)(2) may change dynamically or over time as links are removed from the map data that describes the trajectory data. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1: A method for providing anonymity in geographic data for probe devices in a geographic region for a location-based service, the method comprising:

receiving trajectory data based on sequences of sensor measurements of the probe devices;

generating, by a processor, data representing a map of initial geographic data using a plurality of cells, wherein each of the plurality of cells includes a plurality of edges and a face;

map matching the trajectory data to the plurality of cells;

calculating, by the processor, a number of trajectories in the trajectory data that passes through each of the plurality of edges;

performing, by the processor, a comparison of the number of trajectories in the trajectory data for at least one of the plurality of edges to a threshold; and modifying, by the processor, the geographic data in response to the comparison of the number of trajectories in the trajectory data for the at least one of the plurality of edges.

Embodiment 2: The method of embodiment 1, wherein the map matching further comprises:
assigning at least one point from the trajectory data to a road link.
Embodiment 3: The method of any of embodiments 1 and 2, wherein the road link is a first road link, the method further comprising:
calculating a first probability for the trajectory data and the first road link;
assigning at least one point from the trajectory data to a second road link;
calculating a second probability for the trajectory data and the second road link; and
comparing the first probability and the second probability.
Embodiment 4: The method of any of embodiments 1 to 3, wherein modifying the trajectory data in response to the comparison further comprises:
removing the road link from the geographic data in response to the comparison of the number of trajectories in the trajectory data for the at least one of the plurality of edges.
Embodiment 5: The method of any of embodiments 1 to 4, further comprising:
identifying an adjacent road link closest to the removed road link; and
assigning at least one point from the removed road link to the adjacent road link.
Embodiment 6: The method of any of embodiments 1 to 5, further comprising:
identifying a plurality of segments for the trajectory data; and
selecting one point from each of the plurality of segments.
Embodiment 7: The method of any of embodiments 1 to 6, further comprising:
sorting the trajectory data according to timestamp; and
filtering the trajectory data to the face that includes at least one point of the trajectory data.
Embodiment 8: The method of any of embodiments 1 to 7, further comprising:
outputting anonymized trajectory data to an external service.
Embodiment 9: The method of any of embodiments 1 to 8, wherein the anonymized trajectory data includes a list of links for the modified geographic data including fewer links than the map of the initial geographic data.
Embodiment 10: An apparatus, configured to perform and/or control the method of any of embodiments 1-9 or comprising means for performing and/or controlling any of embodiments 1-9.
Embodiment 11: An apparatus, comprising at least one processor and at least one memory including computer program code for one or more programs, the at least one memory and the computer program code configured to, with the at least one processor, to perform and/or control the method of any of embodiments 1-9.
Embodiment 15: A computer program comprising instructions operable to cause a processor to perform and/or control the method of any of embodiments 1-9, when the computer program is executed on the processor.

I claim:

1. A method for providing anonymity in geographic data for probe devices in a geographic region for a location-based service, the method comprising:
receiving trajectory data based on sequences of sensor measurements of the probe devices;
generating, by a processor, data representing a map of initial geographic data using a plurality of cells, wherein each of the plurality of cells includes a plurality of edges and a face;
map matching the trajectory data to the plurality of cells;
calculating, by the processor, a number of trajectories in the trajectory data that passes through each of the plurality of edges;
performing, by the processor, a comparison of the number of trajectories in the trajectory data for at least one of the plurality of edges to a threshold;
modifying and filtering, by the processor, the geographic data in response to the comparison of the number of trajectories in the trajectory data for the at least one of the plurality of edges; and outputting, anonymized trajectory data to an external service.

2. The method of claim 1, wherein the map matching further comprises:
assigning at least one point from the trajectory data to a road link.

3. The method of claim 2, wherein the road link is a first road link, the method further comprising:
calculating a first probability for the trajectory data and the first road link;
assigning at least one point from the trajectory data to a second road link;
calculating a second probability for the trajectory data and the second road link; and
comparing the first probability and the second probability.

4. The method of claim 2, wherein modifying and filtering the trajectory data in response to the comparison further comprises:
removing the road link from the geographic data in response to the comparison of the number of trajectories in the trajectory data for the at least one of the plurality of edges.

5. The method of claim 4, further comprising:
identifying an adjacent road link closest to the removed road link; and
assigning at least one point from the removed road link to the adjacent road link.

6. The method of claim 1, further comprising:
identifying a plurality of segments for the trajectory data; and
selecting one point from each of the plurality of segments.

7. The method of claim 1, further comprising:
sorting the trajectory data according to timestamp; and
filtering the trajectory data to the face that includes at least one point of the trajectory data.

8. The method of claim 1, wherein the anonymized trajectory data includes a list of links for the modified geographic data including fewer links than the map of the initial geographic data.

9. An apparatus for providing anonymity in geographic data for probe devices in a geographic region for a location-based service, the apparatus comprising:
a database configured to store trajectory data based on sequences of sensor measurements of the probe devices;
a map matcher configured to match a map, including a plurality of cells, with the trajectory data, wherein each of the plurality of cells includes a plurality of edges and a face;
an aggregation calculator configured to calculate a number of trajectories in the trajectory data that passes through each of the plurality of edges and compare the number of trajectories in the trajectory data for at least one of the plurality of edges to a threshold,
wherein the geographic data is modified and filtered in response to the comparison of the number of trajectories in the trajectory data for the at least one of the plurality of edges; and an anonymization controller to provide anonymized data representing the trajectory data to one or more external service or external device.

10. The apparatus of claim 9, wherein the map matcher is configured to assign at least a first point from the trajectory data to a first road link and assign at least a second point from the trajectory data to a second road link, and wherein the map matcher is configured perform a comparison a first probability for the at least the first point and the first road link with a second probability for the at least the second point and the second road link,
wherein the trajectory data is matched to the map based on the comparison.

11. The apparatus of claim 9, wherein aggregation controller is configured to remove a road link from the geographic data in response to the comparison of the number of trajectories in the trajectory data for the at least one of the plurality of edges.

12. The apparatus of claim 11, wherein the aggregation calculator is configured to identify an adjacent road link closest to the removed road link and assign at least one point from the removed road link to the adjacent road link.

13. The apparatus of claim 9, wherein the aggregation calculator is configured to identify a plurality of segments for the trajectory data and select one point from each of the plurality of segments.

14. The apparatus of claim 9, the aggregation calculator is configured to sort the trajectory data according to timestamp and filter the trajectory data to the face that includes at least one point of the trajectory data.

15. A non-transitory computer readable medium including instructions that when executed by a processor are configured to perform:
map matching trajectory data to a plurality of road segments in a subset of map data;
calculating a number of trajectories in the trajectory data that passes through each of the plurality of road segments;
performing a comparison of the number of trajectories in the trajectory data for at least one of the plurality of road segments to a threshold;
modifying and filtering the subset of map data in response to the comparison of the number of trajectories in the trajectory data for the at least one of the plurality of road segments to the threshold; and outputting anonymized trajectory data to an external service.

16. The non-transitory computer readable medium of claim 15, the instructions further configured to perform:
assigning at least one point from the trajectory data to a first road segment;
calculating a first probability for the trajectory data and the first road segment;
assigning at least one point from the trajectory data to a second road segment;
calculating a second probability for the trajectory data and the second road segment; and
comparing the first probability and the second probability.

17. The non-transitory computer readable medium of claim 15, wherein modifying and filtering the subset of map data further comprises:
removing a road segment from the subset of map data in response to the comparison of the number of trajectories in the trajectory data for the at least one of the plurality of road segments to the threshold.

18. The non-transitory computer readable medium of claim 17, the instructions further configured to perform:
identifying an adjacent road segment closest to the removed road segment; and
assigning at least one point from the removed road segment to the adjacent road segment.

* * * * *